United States Patent
Adler et al.

(10) Patent No.: US 12,547,378 B2
(45) Date of Patent: Feb. 10, 2026

(54) AUGMENTING INTEGRATED DEVELOPMENT ENVIRONMENTS WITH AUXILIARY DATAS

(71) Applicant: Hud Software Platforms Ltd., Tel Aviv (IL)

(72) Inventors: Roee Adler, Tel Aviv (IL); May Walter, Tel Aviv (IL); Shai Wininger, Kerem Maharal (IL)

(73) Assignee: Hud Software Platforms Ltd., Tel Aviv (IL)

( * ) Notice: Subject to any disclaimer, the term of this patent is extended or adjusted under 35 U.S.C. 154(b) by 0 days.

(21) Appl. No.: 18/414,858

(22) Filed: Jan. 17, 2024

(65) Prior Publication Data

US 2025/0130777 A1    Apr. 24, 2025

Related U.S. Application Data

(63) Continuation-in-part of application No. 18/381,935, filed on Oct. 19, 2023, now Pat. No. 11,941,378.

(51) Int. Cl.
   *G06F 8/33*       (2018.01)
   *G06F 11/3604*    (2025.01)

(52) U.S. Cl.
   CPC ............ *G06F 8/33* (2013.01); *G06F 11/3616* (2013.01)

(58) Field of Classification Search
   CPC ................................ G06F 8/33; G06F 11/3616
   USPC .......................................................... 717/104
   See application file for complete search history.

(56) References Cited

U.S. PATENT DOCUMENTS

| | | | |
|---|---|---|---|
| 6,314,559 B1 * | 11/2001 | Sollich | G06F 8/33 717/111 |
| 8,327,324 B1 | 12/2012 | Gong et al. | |
| 8,930,914 B2 | 1/2015 | Cohen et al. | |
| 10,534,585 B1 * | 1/2020 | Eberlein | G06N 5/04 |
| 10,817,604 B1 | 10/2020 | Kimball et al. | |
| 10,871,951 B2 | 12/2020 | Ding et al. | |
| 11,659,324 B1 * | 5/2023 | Donley | H04R 5/033 381/92 |
| 11,748,072 B2 | 9/2023 | Cappello et al. | |
| 2003/0135474 A1 * | 7/2003 | Circenis | G06Q 30/0283 705/400 |
| 2007/0168984 A1 | 7/2007 | Heisi et al. | |
| 2009/0276752 A1 | 11/2009 | Sharma | |
| 2010/0223341 A1 * | 9/2010 | Manolescu | H04L 51/02 709/224 |
| 2012/0117545 A1 | 5/2012 | Yokoi | |

(Continued)

OTHER PUBLICATIONS

Notice of Allowance issued by the USPTO for U.S. Appl. No. 18/381,935, dated Dec. 20, 2023.

*Primary Examiner* — Bradford F Wheaton
(74) *Attorney, Agent, or Firm* — Myers Wolin, LLC

(57) ABSTRACT

A system, product and method for augmenting Integrated Development Environments (IDEs) with auxiliary data. A local context of a developer who is using an IDE to develop a code base is determined. the local context includes a target code element. A set of insights pertaining to the target code element is determined. A subset of the insights is selected and displayed in the IDE in a location adjacent the target code element. Some of the insights are determined based on data derived from a live production environment that hosts a computer program product that is based on the code base or portion thereof.

20 Claims, 10 Drawing Sheets

(56) References Cited

U.S. PATENT DOCUMENTS

| | | |
|---|---|---|
| 2013/0263086 A1 | 10/2013 | Carter et al. |
| 2015/0082277 A1 | 3/2015 | Champlin-Scharff et al. |
| 2016/0092414 A1* | 3/2016 | Kalyanasundaram .... G06F 8/33 715/234 |
| 2018/0060503 A1* | 3/2018 | Allen ..................... G16H 70/20 |
| 2019/0050320 A1* | 2/2019 | Edri ................... G06F 11/3636 |
| 2019/0108001 A1 | 4/2019 | Hauser |
| 2019/0146764 A1 | 5/2019 | Ravindar et al. |
| 2019/0272171 A1* | 9/2019 | Chen ......................... G06F 8/75 |
| 2019/0317885 A1* | 10/2019 | Heinecke ............ G06F 11/3616 |
| 2021/0132915 A1* | 5/2021 | Ivankovic ................. G06F 8/75 |
| 2021/0224717 A1* | 7/2021 | Hicks ............ G06Q 10/063112 |
| 2021/0304142 A1 | 9/2021 | Bar-On et al. |
| 2023/0224493 A1* | 7/2023 | Foley .................... G16H 50/20 375/240.12 |

\* cited by examiner

AUGMENTING INTEGRATED DEVELOPMENT ENVIRONMENTS WITH AUXILIARY DATAS

CROSS-REFERENCE TO RELATED APPLICATIONS

This application is a continuation in part of and claims the benefit of U.S. patent application Ser. No. 18/381,935 filed Oct. 19, 2023, titled "SYSTEM AND METHOD FOR UTILIZING PRODUCTION INSIGHTS IN GENERATIVE AI MODELS", which is hereby incorporated by reference in its entirety without giving rise to disavowment.

TECHNICAL FIELD

The present disclosure relates to software development in general, and to Integrated Development Environments (IDEs), in particular.

BACKGROUND

An integrated development environment (IDE) is a software application that provides a comprehensive set of tools for software development. The IDE facilitates the creation, modification, testing, debugging, and deployment of software programs in one or more programming languages. The IDE may also support various software development methodologies, such as agile, waterfall, or test-driven development.

The IDE comprises a user interface that allows the user to interact with the various tools and features of the IDE. The user interface may include a code editor, a compiler, a debugger, a terminal, a version control system, a code navigator, a code generator, a code analyzer, a code formatter, a code refactoring tool, a code documentation tool, a code testing tool, a code deployment tool, and other tools that assist the user in software development. The user interface may also provide graphical representations of the software program, such as flowcharts, diagrams, or user interface mockups.

The IDE may be configured to support one or more programming languages, such as Java, Python, C#, C++, JavaScript, PHP, Ruby, or Swift. The IDE may also be configured to support one or more programming paradigms, such as object-oriented, functional, procedural, or declarative. The IDE may also be configured to support one or more programming platforms, such as web, mobile, desktop, cloud, or embedded. The IDE may also be configured to support one or more programming frameworks, such as Node.js, Angular, React, Django, Laravel, Spring, or Flutter. The IDE may also be configured to support one or more programming standards, such as HTML, CSS, XML, JSON, or SQL.

BRIEF SUMMARY

One exemplary embodiment of the disclosed subject matter is a method comprising: determining a local context of a developer, the developer is utilizing an Integrated Development Environment (IDE) to develop a code base, the local context includes at least a target code element that is viewable in the IDE; determining a set of insights pertaining to the target code element, the set of insights comprise at least a first insight and a second insight, wherein the first insight is determined based on data derived from a live production environment, wherein the live production environment hosts a computer program product that is an executable program that is based on the code base or portion thereof; selecting a subset of insights based on the set of insights, wherein said selecting excludes at least one insight that is included in the set of insights; and displaying the subset of insights to the developer within the IDE in a location adjacent the target code element, whereby providing the developer with an insight display.

Optionally, the method further comprises: obtaining a third insight pertaining to the target code element, the third insight is determined based on data that is derived from the live production environment at a later time than a time at which the data utilized to determine the first insight is derived, the third insight contradicts the first insight; and in response to said obtaining the third insight, automatically updating the insight display to include the third insight and exclude the first insight.

Optionally, said selecting comprises: selecting one or more insights of the set of insights that have significance measurement above a critical threshold; excluding one or more insights of the set of insights that have significance measurement below a minimal significance threshold; and excluding one or more insights of the set of insights that exceed a recency irrelevance threshold.

Optionally, the IDE is configured to present the insight display using a presentation layer over a displayed code.

Optionally, the presentation layer comprises visual indicators each of which associated with a different insight of the subset of insights, and the method further comprises: in response to the developer interacting with a visual indicator that represents a target insight, opening a portal with added information about data collected that relates to the target insight and all insights related to the target code element, whereby the portal provides information about the at least one insight that is included in the set of insights and excluded from the subset of insights.

Optionally, the second insight is determined based on data collected based on monitored developers' activity in a development environment that is used to develop the code base.

Optionally, the second insight relates to another developer viewing the target code element.

Optionally, the second insight is determined based on data collected from a Version Control System (VCS) regarding changes made to the code base.

Optionally, the local context is determined based on at least one of: a location of a keyboard cursor in the IDE; a location of a mouse cursor in the IDE; a code file that is opened in the IDE; and a visible portion of the code that is displayed to the user in the IDE.

Optionally, the code element is a function, whereby production insights are provided in a function-level granularity.

Optionally, the first insight comprises at least one of: an error rate metric indicating an error rate of the code element when executed in the live production environment; an execution duration metric indicating an execution duration of the code element when executed in the live production environment; an invocation frequency metric indicating an invocation frequency of the code element in the live production environment; and a resource utilization metric indicating utilization of third-party resources by the code element when executed in the live production environment.

Optionally, the data derived from the live production environment is obtained from a logging tool, the logging tool is configured to collect information regarding execution of the computer program product, the logging tool is executed in the live production environment and is configured to monitor execution of the computer program product.

Another exemplary embodiment of the disclosed subject matter is a computer program product comprising a non-transitory computer readable medium retaining program instruction, which program instructions when read by a processor, cause the processor to perform: determining a local context of a developer, the developer is utilizing an Integrated Development Environment (IDE) to develop a code base, the local context includes at least a target code element that is viewable in the IDE; determining a set of insights pertaining to the target code element, the set of insights comprise at least a first insight and a second insight, wherein the first insight is determined based on data derived from a live production environment, wherein the live production environment hosts a computer program product that is an executable program that is based on the code base or portion thereof; selecting a subset of insights based on the set of insights, wherein said selecting excludes at least one insight that is included in the set of insights; and displaying the subset of insights to the developer within the IDE in a location adjacent the target code element, whereby providing the developer with an insight display.

Yet another exemplary embodiment of the disclosed subject matter is a system comprising: a client device executing an Integrated Development Environment (IDE), a developer is using the IDE to develop a code base; a live production environment that hosts a computer program product that is an executable program that is based on the code base or portion thereof, the live production environment executes the computer program product; and a processor configured to: determine a local context of the developer based on a usage of the developer of the IDE, the local context includes at least a target code element; determine a set of insights pertaining to the target code element, the set of insights comprise at least a first insight and a second insight, wherein the first insight is determined based on data derived from the live production environment; select a subset of insights based on the set of insights, whereby excluding at least one insight that is included in the set of insights; wherein the IDE is configured to provide the developer with an insight display, the insight display displays the subset of insights within the IDE in a location adjacent the target code element.

Optionally, the system further comprises: a Version Control System (VCS) utilized for managing and tracking changes in the code base; a logging tool that is deployed in said live production environment and configured to monitor execution of the computer program product, wherein the logging tool is configured to collect information regarding execution of the computer program product in the live production environment; and an insight engine configured to determine insights pertaining to the code base, wherein the insight engine is configured to determine the insights based on information collected by said logging tool, based on data collected from the VCS regarding changes made to the code base, and based on monitored developers' activity in the IDEs that are used to develop the code base.

Optionally, the IDE is configured to present the insight display using a presentation layer over a displayed code, the presentation layer comprises visual indicators each of which associated with a different insight of the subset of insights.

Optionally, the system is responsive to a user interaction with a visual indicator that represents a target insight, wherein in response to the user interaction, the system is configured to open a portal to display added information about data collected that relates to the target insight and all insights related to the target code element, whereby the portal provides information about the at least one insight that is included in the set of insights and excluded from the subset of insights.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 2A-2B show schematic illustrations of IDEs, in accordance with some exemplary embodiments of the disclosed subject matter;

DETAILED DESCRIPTION

Figure 1A:
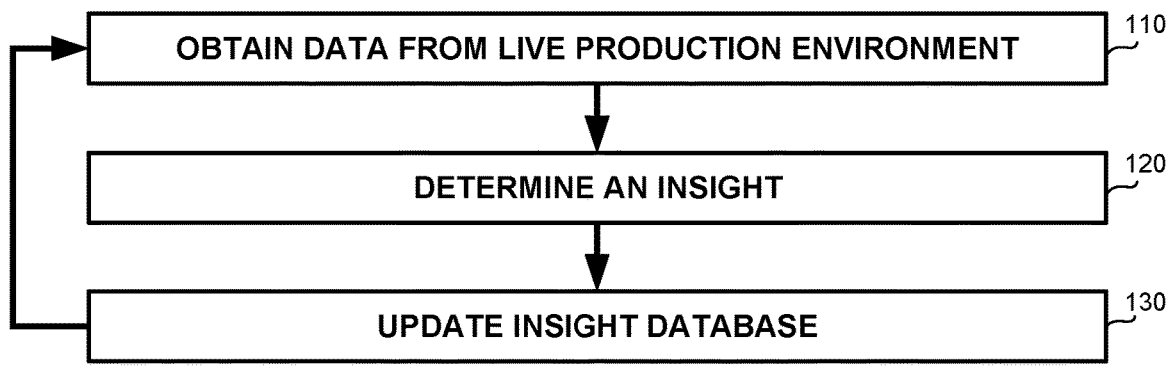
FIGS. 1A-1D show flowchart diagrams of methods, in accordance with some exemplary embodiments of the disclosed subject matter.

One technical problem dealt with by the disclosed subject matter is integrating contextual data into the software development environment. In order to allow engineers to have a better understanding of the software they are developing, it may be useful to provide them with relevant contextual information about the relevant code base, its production environment, and other pertinent factors. Such contextual information may stem from various sources, including production environments, error logs, source code history, local environments of other engineers, Software as a Service (SaaS) logs, or the like, to provide context and insights for the software engineers.

Another technical problem dealt with by the disclosed subject matter relates to data collection and integration. Gathering data from diverse sources, such as different runtime environments, error logs, and code histories, and providing useful feedback that balances between significance, brevity, and specificity of many different data points, may be a considerable challenge. It may be desired to expose only data that is of sufficient significance (e.g., data point with a significance measurement above a minimal threshold). It may be desired to treat highly significant data points differently (e.g., data point with a significance measurement above a critical threshold). Additionally, or alternatively, it may be desired to provide a concise and brief amount of information to the user. For example, there may be a limit on the amount of data points shown to the user, e.g., no more than a maximum number of concurrent data points regarding the same function. In such a case, the potential data points for presentation may be prioritized and only a subset thereof may be shown to the user. Additionally, or alternatively, the data points that are shown may be user-specific. Different data points for the same function may be presented to different users, such as due to their specific expertise or lack of expertise in certain areas.

Another technical problem may be creating contextual insights from the collected data to provide meaningful insights into the software development process. This context may be required to include information about the function's runtime environment, error history, cost implications, or the like.

Yet another technical problem addressed by this technical problem may be the integration of these contextual insights into the coding environment of the IDE used by the software developer, also referred to as the engineer or the user. In some cases, the contextual insights are dynamically updated as new information becomes available. This may allow the developer to rely on the latest insights, such as changes in production, error patterns, or other engineers' activities.

One technical solution is to automatically gather data from various data sources, at a desired granular level. In some exemplary embodiments, a system that autonomously gathers real-time production insights related to specific code elements, such as functions, from a live production environment may be deployed. The system may be configured to derive production insights pertaining to code elements within the code base, based on data from the production environments relevant to the code elements, such as error logs, code history, local environments, SaaS logs, or the like. The insights may comprise real-time information from the production environment, such as information regarding performance, frequency, costs, error/exceptions, or the like. The system may gather data and derive insights from a Version Control System (VCS) or any other software configuration management system that is utilized by developers when updating the code base. The data for these insights may be collected directly from the VCS used by the development team. The VCS may keep a detailed record of all code changes, which can be analyzed to extract meaningful insights into the development process. For example, insights may be derived from source code history, such as details about the history of code changes made to functions, changes correlated with the introduction or resolution of production errors, or the like. The system may track current activities and changes taking place in the local development environments of other developers working on the same code base, and derive insights based on such information.

It is noted that the disclosed subject matter may be utilized with respect to different granularity levels. One potential granularity level may be a function-level granularity, in which insights are provided for each function independently. Other granularity levels may be based on code blocks, classes, files, or the like. The present disclosure makes use of the function-level granularity for ease of description. However, the disclosed subject matter should not be construed to be limited to this specific granularity level, unless otherwise explicitly stated in the claims.

In some exemplary embodiments, the insights may be displayed to the software developer within the IDE, in the context of the relevant code element. The selection of the which insights to display may be specific to the developer, may take into account other developers' activities, may be based on prioritization of relevant insights and on significance measurement of the insight. The insights may be displayed using visual indications, such as using icons or other visual representations. Additionally, or alternatively, the insights may be incorporated into the code base as comments, annotations, or the like, ensuring they do not disrupt the functionality of the code base and do not prevent its compilation.

One technical effect of the disclosed subject may be improving the software development process, ultimately leading to more efficient and error-free code development. The disclosed subject matter enhances the development process by providing real-time context, improving code quality, and facilitating efficient collaboration between developers, all provided within the IDE the developers use and without the developers having to switch between different environments (e.g., production environment and development environment)

Another technical effect of the disclosed subject may be improving real-time data integration. The disclosed subject matter allows for the integration of real-time production insights from diverse sources. This enables developers to access up-to-date information about the code elements. Furthermore, the disclosed subject matter supports dynamic updates of the human-readable text based on various triggers, such as but not limited to changes that are identified in production environment, error occurrences, and developer activities. This ensures that the displayed insights are relevant and current. Additionally, or alternatively, the disclosed subject matter enables the generation of alerts to inform users of potential consequences related to code changes. These alerts are based on production insights, other developers' activities, and the like, helping users make informed decisions about code modifications.

Yet another technical effect of the disclosed subject may be enhancing code quality. By exposing insights (production and non-production), developers can make more informed decisions during software development. This may lead to code that performs better, has reduced number of errors, and considers various contextual factors, such as runtime environment, performance history, and potential conflicts with other developers' activities.

Overall, the disclosed subject matter represents a significant advancement in the field of software development by simplifying the integration of production data into the code development process, enhancing code quality, and improving the efficiency of the software development process. The provisioning of real-time insights empowers developers to create code that aligns seamlessly with production environments and user requirements.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIGS. 1A-1D showing flowchart diagrams of methods, in accordance with some exemplary embodiments of the disclosed subject matter.

On Step 110, data may be derived from a live production environment. The live production environment, also referred to as the deployment environment, may be the set of computers where user-ready software is deployed and executed. The live product environment may be utilized to execute executable software that was developed in the code base. In some exemplary embodiments, the executable software may be an outcome of a compilation process. The code base may be compiled (entirely or partially) to create the executable computer program product that is deployed to the production environment and executed thereon to be used by its intended users. It is noted that the compiled product that is being executed may be a single executable file or a set of executable files, that may be executed on a single computer, several computers, or the like. Additionally, or alternatively, the executable software may be developed using an interpreter-based language, such as Ruby™, Python™, JavaScript™, or the like. In such a case, the code base may not be compiled to obtain the executable software. Instead, the executable software may be the code base (or portion thereof) that is configured to be executed by an interpreter. In some cases, the code base may undergo optimization, transpilation, or the like, before being executed by an interperter. It is noted that the disclosed subject matter is not limited to a specific execution manner and may be applied to compiled binary code, code executed by an interpreter, code executed by a two-pass interpreter, hybrid code comprising portions executed in different manners, or the like.

In some cases, the live production environment may host the final version of the software. However, in some cases, their deployed program may not be a finished version but may be a version that is considered sufficiently stable, and that has undergone sufficient testing and quality assurance efforts, before being deployed in the live production environment. In some exemplary embodiments, the live production environment may be an on-premise platform, a cloud-based platform, or combination thereof, or the like. The live production environment may be in different containerized scenarios, such as no containers environment, dockerized environment, Kubernetes environment, or the like.

In some exemplary embodiments, the live production environment may be distinguished from the testing or development environment, in which the software is being developed and/or tested until a version is developed and deployed to the live production environment.

In some exemplary embodiments, the data may be obtained by monitoring the execution of the computer product in the live production environment. The data may be production data that is derived from the live production environment, such as performance metrics, system frequency information, cost analysis results, error reports, exception logs, version updates and reverts in production, or the like. For example, the data may include a number of times a function was executed in the live production environment, a number of times the function was executed during a timeframe, a number of invocations of a third-party SaaS service, a cost of the invocations of the third-party SaaS service during a timeframe, a resource utilization of the function when executed during a timeframe, a log of errors that were caused by the execution of the function during a timeframe, or the like.

In some exemplary embodiments, the data may comprise information from a logging tool, regarding execution of the computer program product. The logging tool may be executed in the live production environment and may be configured to monitor the execution of the computer program product. As an example, the data may comprise information from error logs, such as information about common production errors, recent error occurrences related to the execution of a certain function, or any other type of data helping in identifying and understanding error patterns. As another example, the data may comprise information from SaaS logs about interactions with third-party SaaS platforms, such as the frequency and extent of service usage, or the like.

In some exemplary embodiments, the data may be collected at a granular level, focusing on individual code elements within the source code. Specific data points may be associated with particular functions contained within code files. This function-level granularity provides a high degree of precision and context when working with the collected data. As an example, the data associated with a certain function may comprise function execution locations. For each function in the code base, information about where the function runs may be gathered, along with details about the executables or services in which the function is executed. As another example, the data associated with a certain function may comprise server information including where each function is deployed, information about the utilization of these servers, whether they are operating near their capacity limits, or the like. It is noted that the server information may relate to physical servers, virtual servers, servers operating in a serverless environment, or the like. As yet another example, the data associated with a certain function may comprise the invocation rate of the function, e.g., the frequency at which each function is invoked within the various servers is tracked. As yet another example, the data associated with a certain function may comprise cost analysis of the function, such as data related to the cost of running each function, insights into the financial implications of function execution, or the like. As yet another example, the data associated with a certain function may comprise performance metrics of the function, such as the duration it takes for each function to complete its execution, whether the performance of the monitored function has been deteriorating over time, which may be crucial for identifying potential performance bottlenecks and related insights. As yet another example, the data associated with a certain function may comprise error information, such as which exceptions are thrown by the function, the rate of errors occurring when the function is executed, or the like. As yet another example, the data associated with a certain function may comprise function version reversions that occurred following increases in errors in production. It is noted that updates and reversions of versions in production may be considered a production issue. A function that is updated in production and malfunctions (e.g., throws exceptions at an unusually high rate) may be reverted back in the production environment. Such reversion of the function may not be tracked in the development environment, and may not necessarily be reflected in the code base management system (e.g., GitHub™). However, such information may be useful to derive insights regarding the operation of the function. For example, a developer developing code that interconnects with such functions could utilize the insight of an erroneous version that malfunctioned, so as to improve the newly developed code, e.g., avoiding making the same or similar mistakes. As yet another example, the data associated with a certain function may comprise Cross-Service and Cross-Repository interactions. A mapping of services may be performed to identify interactions between services. The mapping may be configured to track which other services invoke a particular service, whether code from the same repository interacts with the service, whether code from different repositories interacts with it, or if there are completely external invocations. The mapping may be configured to assist in establishing the relationships and dependencies between various code elements and services.

In some exemplary embodiments, any of the following data points may be tracked and collected from the live production environment.

In some exemplary embodiments, the data collected may include whenever a code element (e.g., function) runs in production, and the frequency of runs. For example, one dimension of saving this data is by absolute time, saved in multiple dimensions, for example across different servers and services. So, if a code element exists in two different services, its invocation frequency for each service separately, as well as combined may be tracked and collected. Additionally, or alternatively, a median and a 90th percentile of different time bins may be tracked. For example, basic bins may be hourly, collecting invocations per hour. In some cases, weekly bins may be tracked. As another example, the 90th percentile of the hourly frequency may be tracked on a weekly basis. It is noted that the duration of the bins may be configurable by an administrator, as well as the exact percentile (e.g., 70, 85, 90, 95, or the like) being tracked. In some cases, several different percentiles may be tracked (e.g., tracking percentiles 70, 90, 95, and 99).

In some exemplary embodiments, for each execution of a code element (e.g., function), the disclosed subject matter may monitor and collect the duration, CPU load, network load, local storage load, or the like.

In some exemplary embodiments, the disclosed subject matter may monitor the production behavioral signature of a code element. The production behavioral signature may be a set of statistical features relating to the performance of the code element (e.g., average execution duration, average CPU load, median, standard variation, or the like). In case where there is a recent subset of the information that creates a different signature that is statistically significant than the previous signature, the dataset may be updated accordingly to reflect this change. The change may indicate that the code element is slowing down, consuming more or less resources than before, or the like.

In some exemplary embodiments, if a code element starts throwing errors in production, a summary of those errors may be collected and stored. In some exemplary embodiments, the summary may be a number of errors of each error type that were identified within a time window. As in most cases, the errors stemming from the same code element tend to be of the same type, such a representation is compact and efficient in memory space and storage space. In some exemplary embodiments, based on the summary, a string can be generated a presented to a developer, such as "12 of error type [X], 20 of error type [Y] were thrown within the 30 m time window [A:B]".

In some exemplary embodiments, each time the code element makes a call to an external synchronous service (i.e. it waits for it to return before continuing execution), e.g. a write to a database, querying a database, or calling a third-party SaaS service, may be collected. In some exemplary embodiments, for each service that is called by the code element, the disclosed subject matter may track how often the service is called, how long the code element waits for the service to complete, or the like. Some code elements may invoke external services on some executions and avoid invoking such services on other executions. For example, there could be a function that runs 1000 times, but only in 50 of them the function invokes a "database-write" query. The frequency data of the external synchronous service invocation may be retained as a fraction of the code element invocations (e.g. in the example above it will be 5%). Additionally, or alternatively, the time-related frequency, e.g., a number of invocations per time duration (e.g., invocations per hour, per day, per week, or the like).

Figure 1B:
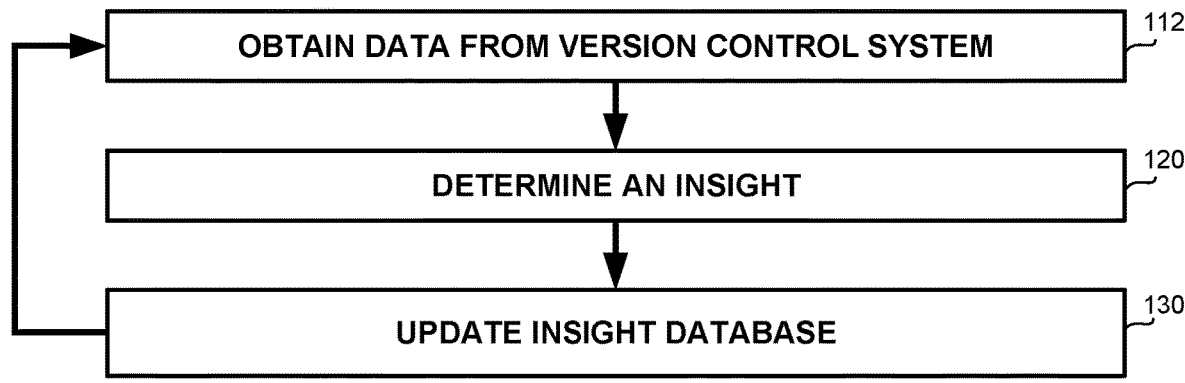
Figure 1C:
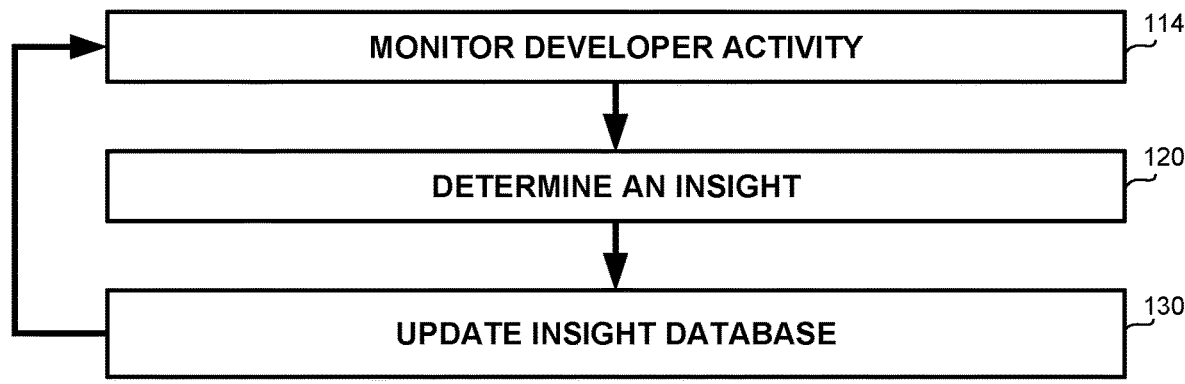

On Steps 112 of FIG. 1B and 114 of FIG. 1C, non-production data is collected. The data may be collected from a VCS or based on developers' activity that is being monitored.

In some exemplary embodiments, the VCS history may be scanned to map for each code element who was the first developer to write it, and who are the developers that contributed the most to it. In some cases, such a mapping may be referred to as a Contribution Map (CM). When a new contribution of code is introduced to the VCS, the CM may be updated to reflect it.

In some exemplary embodiments, user activity may be tracked to identify code updates that have not yet been committed to the VCS. For example, a software agent may monitor user activity on the local computer or using the IDE. Code elements that were updated and saved, but have not yet been merged into the main version in the VCS may be collected. In some cases, with every such change, the new version of the code element is collected and retained in a dataset with an identification of the developer who made the changes. In some cases, where applicable, the change is associated with a branch identifier in the VCS, as well as with the developer. Additionally, or alternatively, on the local IDE, code elements that are being edited by the developer right now, and have not been saved yet, are also collected. With every such IDE edit, the currently edited version may be collected together with an identifier of the developer who made the changes in our dataset. Once the developer saves the changes, they move from being "currently edited" to "saved but not committed".

In some exemplary embodiments, developer activity may be monitored to track the location of the developer's keyboard cursor and mouse cursor. Additionally, or alternatively, a portion of the code that is visible to the developer at any given moment may be tracked, as well as debugged code elements. In some cases, from the moment a branch opens in the VCS, the disclosed subject matter may start collecting how many times a specific code element was viewed by the developer, giving extra weight to cases when the keyboard cursor or the mouse cursor was in/on the code element itself. Based on such information, a list of code elements that are "heavily viewed" by the developer may be created and retained to be used for insight generation.

A "heavily viewed" code element may be identified based on developer viewing the code element or otherwise interacting therewith or referring thereto, in a time duration above a threshold within a recent time window. For example, if during the recent time window, the developer had viewed 10 code elements, the 90-th percentile element may be deemed "highly viewed". As another example, if, based on historic monitoring data, a developer updates code elements within the code base that she views for an average time duration of five minutes, a code element may be considered "heavily viewed" if it is viewed for five minutes. In some cases, a relative threshold and an absolute threshold may be used, either alone or in combination. The thresholds (relative or absolute) may be pre-set, configurable to be defined or set by the developer or a DevOps engineer, may be determined based on a statistical computation made based on historic tracking of the developer, other developers, or the like.

In some cases, the list of code elements that are "heavily viewed" may be branch-specific and with the merging of the branch or the creation of a new branch, the information may be considered no longer relevant. Consider the following example. Developer John may view heavily code element C when working on branch B1. If another developer is working on C as well, a warning may be shown based on this information. However, if John no longer works on branch B1, but rather works on branch B2, the warning may not be shown as it may be considered no longer relevant. In some cases, the information may be relevant as long as the branch exists and John may potentially continue to work on it. Additionally, or alternatively, a branch may be considered relevant if the developer had edited it within a time window (e.g., in the last week, the last month, or the like).

It is noted that the "heavily viewed" indication is different than a "currently viewed" indication which is common in collaborative tools, and does not necessarily indicate that the developer is at the same time actually viewing the code element. This difference stems from the nature of software development. When writing software, a developer may focus on a specific code element for a relatively long period of time. When the developer moves away to view a different code portion, or even not view any code (e.g., reading documentation external to the code, participating in online discussions, executing tests in the development environment, or even conducting a discussion with a colleague), it does not mean that the developer's interest in the same code element has ended.

On Step 120, an insight pertaining to a code element within a code base may be determined based on the data obtained on any of Steps 110, 112 and/or 114. In some exemplary embodiments, the insight may be a production insight derived from the information obtained from the production environment, the logging tool, or other resources. The insight may be useful provide a developer with contextual information, enabling the developer to make more informed decisions regarding the code base. The insight may be useful to empower the developer to identify potential consequences of the code elements that would otherwise remain hidden, such as detecting and alerting users to the possible impacts of code changes on performance, costs, error rates, or other critical factors, thereby enhancing code quality and decision-making.

It is noted that some insights may be determined based on non-production data, as is exemplified in FIGS. 1B-1C. For example, insights may be derived from source code history (Step 112 of FIG. 1B), such as details about the history of code changes made to functions, changes correlated with the introduction or resolution of production errors, or the like. As another example, the insight may be determined based on data obtained from the development environment, from IDEs, or the like (Step 114 of FIG. 1C). The data may comprise current activities and changes taking place in the local development environments of other engineers working on the same code base.

In some exemplary embodiments, the insight may be determined by a server, a cluster of servers, a cloud-based server, or the like. In some cases, insights may be determined by a software agent at a central entity and be distributed to software agents that operate on client devices to be utilized thereby. In some cases, the utilization of the insights may be performed by the software agent at the central entity.

As an example, and without loss of generality, software agents may be deployed on client devices. The software agents may be integrated and operate within an IDE. For example, the software agent may be implemented (in whole or in part) as an IDE extension, an IDE plugin, or the like. In another example, the software agent may be deployed at a service, and may not be integrated with any IDE. Instead, the software agent may be configured to update, from the central entity, the code base, such as using a "ghost" account, using a plugin or API of the relevant system (e.g., GitHub™ plugin), or the like.

The determination of the insight may be performed by computing a pre-defined metric (e.g., computing a number of invocations identified by a logging tool during a timeframe). Additionally, or alternatively, some insights may be determined using AI tools, such as a Large Language Model (LLM), that may receive a prompt that includes the production data and a request to determine and produce the insight.

In some exemplary embodiments, the insight pertaining to the code element may be determined in a function-level granularity, e.g., related to a certain function, a portion thereof, a set of related functions, or the like. The insight may be a production insight, such as an error rate metric indicating an error rate of the code element (e.g., the function) when executed in the live production environment, an execution duration metric indicating an execution duration of the code element when executed in the live production environment, an invocation frequency metric indicating an invocation frequency of the code element in the live production environment, a resource utilization metric indicating utilization of third-party resources by the code element when executed in the live production environment, or the like.

Additionally, or alternatively, the insight may be a non-production insight, enabling software development teams improve their processes, collaboration, and code quality, ultimately leading to more efficient and effective software development practices. The non-production insights may comprise insights related to code review feedback from team members or peers, including suggestions for improvement, code style adherence, best practices, or the like; insights about the efficiency of the development workflow, such as the time taken to complete specific development tasks, bottlenecks in the process, opportunities for optimization, or the like. Additionally, or alternatively, non-production insights may comprise insights on code complexity trends over time, insights regarding resource utilization of development resources, such as hardware, software licenses, or cloud resources, and recommendations for optimizing resource allocation.

Additionally, or alternatively, the insight may be derived from a VCS or any other software configuration management system that is utilized by developers when updating the code base. The data for these insights may be collected directly from the VCS used by the development team. The VCS may keep a detailed record of all code changes, which can be analyzed to extract meaningful insights into the development process.

In some exemplary embodiments, VCS such as, Git™, SVN™, Mercurial™, or the like, may be used by development teams to manage changes to the code base, track the history of modifications, and enable collaboration among team members. Such systems may be configured to record every change made to the code base, including who made the change, when it was made, and the nature of the change (e.g., code additions, deletions, modifications). Insights derived from VCS may offer a window into the collaborative and iterative nature of software development, enabling teams to assess their workflows, identify areas for improvement, and ensure that code changes are effectively managed throughout the development lifecycle. Insights derived from VCS activity can provide valuable information to development teams and project managers, helping them understand the dynamics of code changes and the health of the development process. The VCS insight may comprise insights about frequency of commits (how frequently developers are committing changes to the version control system, periods of intense development activity or identify times when development has slowed down, or the like); insights about branching patterns (when new branches are created, merged, or abandoned, providing visibility into feature development or bug-fixing efforts); code review metrics; conflict resolutions; identities of original developers of code elements; identities of contributors to code elements; identifying code elements that were developed by staff members that are have been identified to be associated with specific types of bugs; or the like.

On Step 130, an insights database may be updated to include the insights. The insights database may be accessible to software agents (e.g., a dedicated IDE, an IDE extension, a local agent executed by the client device, or the like) and utilized thereby in providing output to the developer.

Figure 1D:
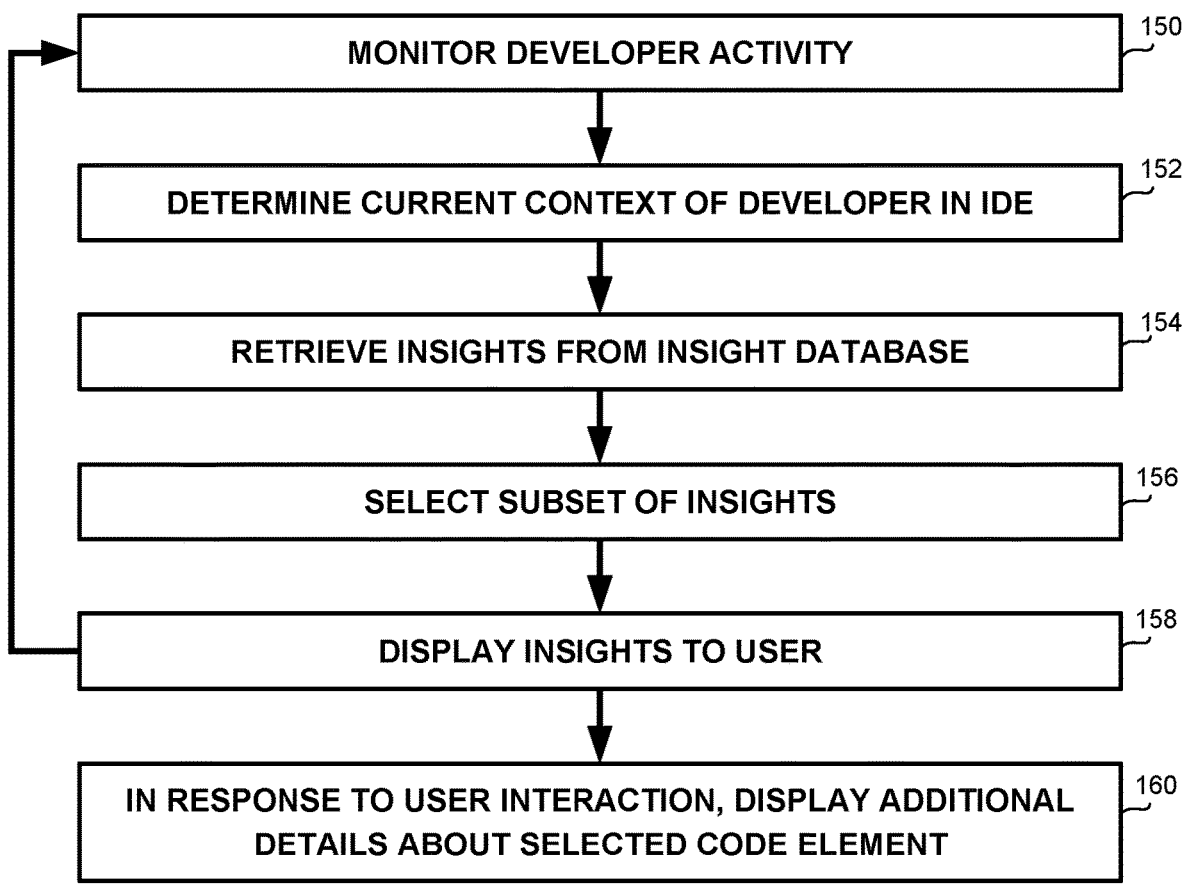

Referring now to FIG. 1D, showing a flowchart of a method, in accordance with a disclosed subject matter. FIG. 1D illustrates a method utilizing the information gathered in Figured 1A-1C.

On Step 150, developer activity is monitored. In some exemplary embodiments, a software agent may be deployed in a manner enabling monitoring of developer activity. As an example, the software agent may be integrated into the IDE, such as in case of an IDE plugin or IDE extension. Additionally, or alternatively, the IDE may be a dedicated IDE having the functionality of the software agent integrated therein. Additionally, or alternatively, a local agent may be executed by the user device at the local operating system level, and may monitor activities of the OS, enabling the monitoring of developer activity with connection to the IDE. Additionally, or alternatively, the IDE may be a web-based IDE, and the software agent may be integrated to the browser used by the developer to access the web-based IDE, such as in case of a dedicated browser, a browser extension, or the like. Additionally, or alternatively, the software agent may be implemented as a client-side code served as part of the web-based IDE to the user device of the developer.

In some exemplary embodiments, monitored activity may include tracking the location of the mouse curser, the location of the keyboard curser, the visible portions of the code shown to the developer in the IDE, or the like. Additionally, or alternatively, monitoring developer activity may include tracking current un-saved version of the code within the IDE. Additionally, or alternatively, the monitored activity may include identifying debugging activity and its target (e.g., debugged code lines, code elements, or the like).

On Step 152, a current context of the developer within the IDE may be determined. In some exemplary embodiments, the current context may include one or more code elements the developer is reviewing. In some cases, the current context may include all visible code elements shown to the developer. Additionally, or alternatively, the current context may include information about which code elements the developer focuses on, between those the developer can see. For example, using cursors monitoring, it may be determined that one function is heavily viewed by the developer while another adjacent function, which might also be visible to the developer, is not heavily viewed. It is noted that the term "heavily viewed" should be understood as viewed or interacted with, in a measurable amount above a threshold. In some cases, the determination may be based on a function that gives a lower weight to occurrences where the code element was visible than to occurrences where the cursor was on or in the code element. Additionally, or alternatively, the function may give lower weights to occurrences where the cursor was on or in the code element than to occurrences where the developer updated the code element.

In some exemplary embodiments, the current context may also depend on the developer's identity and his or her strengths and expertise. In some cases, some developers have higher abilities to deal with certain kinds of issues. For each developer, a list of strengths or expertise may be retained. The list may be inferred from the history of code contributions of each developer. Additionally, or alternatively, the list may be created or updated manually by the developer. In some exemplary embodiments, the list of strengths and expertise may be utilized to bias the selection of insights to be presented to the developer (Step 156) to be better suited for the developer's needs. For example, a developer may have "performance optimization" expertise, which would mean that in case a function has a performance issue, the threshold for it to be presented to that developer will be lower compared to another developer who does not have the same expertise.

On Step 154, insights may be retrieved from the insights database. In some exemplary embodiments, the retrieval may be based on the current context of the developer. In some cases, insights associated with the code elements that are viewed or visible to the user may be obtained, and insights of non-visible code elements may not be retrieved. In some cases, to avoid a delay in presentation, insights may be obtained with respect to all code elements of a file that is open in the IDE, even if some of the code elements are not visible at the moment.

On Step 156, a subset of the insights may be selected for display. It is noted that instead of making the selection posteriori, the selection may be made a-priori during the retrieval phase. The selection is made such that between a number of insights regarding a code element, at least one insight is excluded and not selected. For example, out of 10 insights relating to a code element, only a subset of 3 insights are selected and 7 insights are not selected and are excluded from the subset.

The selection of relevant insights may be made in an attempt to strike a fine balance between significance, brevity, and specificity. In some cases, there may be a maximal number of insights that can be displayed with respect to a code element. Top N insights should be selected. For example, each code element may be presented with no more than a threshold number (e.g., 3, 4, 5) insights. In many cases there will be more than the threshold number of insights that have sufficient significance. A score may be computed to determine priority between insights. In some cases, the threshold may be relevant to non-critical insights and insights deemed critical may be displayed even if there are more such insights than the threshold.

In some exemplary embodiments, the score may be computed using a score function. In some cases, the score function may assign the minimal value (e.g., 0) if the value of the insight is below a significance threshold related to the type of insight, or if recency below irrelevance threshold of the type of insight. Additionally, or alternatively, the score function may assign the maximal value (e.g., 1, infinity, etc), if the value of the insight is above a critical threshold of the type of insight. Otherwise, the score may be computed based on a heuristic taking into account the value of the insight, recency, and specificity. Put differently, the function may be: score $(in) =$ $$\begin{cases} 0 & v(in) < sigThreshold(Type(in)) \\ 0 & recency(in) < recThreshold(Type(in)) \\ \infty & v(in) > criticalThreshold(Type(in)) \\ func(in) & \text{otherwise} \end{cases}.$$

where in is the insight, v(in) is the value of insight in, Type(in) is the type of insight in, SigThreshold(T) is the significance threshold of insight of type T, recency(in) is the recency information of insight in, recThreshold(T) is the recency threshold of insight of type T, and criticalThreshold (T) is the critical threshold of insight of type T. func(in) may be a function computing the score for insight in in case lowest or highest value are not assignable based on the relevant conditions. As an example, the function may be defined as follows: func(in)=impact (Type(in))·heuristic(v (in), recency(in), specificty(in)), where impact(T) is a weight based on potential impact of an insight of type T may have, heuristic (v,r,s) takes into considerations value (v), recency (r) and specificity(s) to compute a weight.

In some exemplary embodiments, the selection may be based on any combination of the factors below.

Recency: if a new insight was just added, it will receive high weight. For example, if the function just ran in production right now, it may receive a higher score.

Strength: most metrics have a dynamic range, and higher a value, the more weight it will receive, with a formula that is based on each particular metric. For example, if a developer has been looking at a certain function, the more they look at it the more weight that is assigned to the insight that "someone else is looking at this function", and above a certain threshold it will be shown in the IDE for every other developer looking at the same function. Another example would be an increase in function duration: an increase of 100% is "stronger" than an increase of 10%—this will be taken into consideration in the score function.

Impact: some insights have a high impact on any work to be done on the function and must be taken into consideration by the developer, so they will receive extra weight. For example: if another developer changes the function in their local machine but haven't committed it yet, such insight may be considered of high impact.

Severity: some insights have higher severity and will receive disproportionate weight. For example, insights that are related to errors thrown in production may be considered of a relative high severity compared to insights related to increased computation resource utilization.

The following is a concrete example of insights and relevant impact value, significance threshold, critical threshold, recency irrelevance threshold, and specificity information.

| Insight Type | Impact | Significance threshold | Critical threshold | Recency irrelevance threshold | Specificity |
|---|---|---|---|---|---|
| Duration increase | 3 | >10% | >300% | >1 week | Users with optimization experience |
| CPU usage increase | 2 | >10% | >50% | >1 week | Users with optimization experience |
| Other users viewing the function | 1 | >20 seconds | N/A | >2 days | |
| Errors increase in production | 4 | >30% | >100% | >2 weeks | Users who edited this function |
| Function edited but not committed | 5 | ANY | ANY | >2 weeks | |

In the above example, duration increase insights are considered significant and relevant to be shown only if they are above 10%. In case they are above 300%, they are considered critical and must be shown. Insight that is older than one week, is deemed irrelevant as it is not recent enough. Errors increase in production insight is considered relevant if it is no more than two weeks old. Such an insight is significant if it shows at least 30% increase and is considered critical if it exceeds 100% increase. The impact factor of this insight type is higher than the duration time insight, as such insight may have more meaningful impact on the developed software than the duration time insight.

On Step 158, the selected subset of insights is displayed to the user. The insights may be displayed to the developer within the IDE, adjacent to the relevant code element they relate to. In some cases, the insights may be conveyed to the developer using textual comments, visual indications, graphical icons, or the like.

In some exemplary embodiments, text conveying the insights may be inserted to the code base as a comment, which may be ignored by the compiler when compiling the code base. As an example, a text relating to the subset of insights may be planted as a separate comment positioned above the relevant function, making it readily visible to developers reviewing the code. As another example, a subset of the structured context may be included in the comments, along with instructions guiding a computerized tool to locate the remaining content in a different non-code file within the code base repository, specifying either a local file address or a folder/file address, or to retrieve it from a URL as needed.

Additionally, or alternatively, the text may be inserted to the code base in a separate textual file. In such a case, a comment pointing to the separate textual file may be introduced to the code base, indicating a relevant insight is added in the file. The separate textual file may be a non-code file, such as a text file resource within the code base (e.g., README or LICENSE files). In another example, the separate textual file may be a code file that is used to hold comments that augment the code base with insight information. For example, a dedicated code-file that holds the insight information regarding function my_func defined in file named "my_code.c", may be a file named "my_func_insights.c" and hold non-executable lines, such as comments, with the insight information. In the my_code.c file, in proximity to the my_func definition or declaration, there may be an #include instruction to include the content of the "my_func_insights.c" file, thereby introducing the insights into the code base using a pre-processing directive. As another example, a dedicated comments file for the entire code repository, a single file per folder or per set of folders may be utilized. It is noted that aggregating many comments in a single file may reduce the number of changes in the VCS that are needed when new insights are obtained, thereby improving overall performance of the system.

Additionally, or alternatively, the comments may be placed within a comment near the headers to indicate the presence of additional context stored either in a separate file within the code base repository or accessible via a link, a path, a URL, or the like. As an example, for comprehensive coverage, the entire structured context may be inserted in a file within the code base repository, such as in a README file, in a LICENESE file, or the like. In some exemplary embodiments, one file may include information about several functions. Additionally, or alternatively, information about each function may be included in a different file.

In some exemplary embodiments, a software agent implemented at the user's IDE may be configured to display the insights as if they are presented in the code itself. In some cases, contextual information interspersed within the code may be presented visually to the user instead of, or in addition to the text that is added to the code base. In some exemplary embodiments, the text that is inserted to the code base may be visually replaced by the software agent with the content of the file it points to, or to the relevant information to the function in such file.

In some exemplary embodiments, the insights may be presented in connection to the code base by the software agent, even without updating the code base. As an example, the insights may be planted from an IDE plugin, such as by inserting markers or other visual aids to indicate the insights.

In some exemplary embodiments, the timing of presenting insights to the developer may thoughtfully be determined, taking into account the intricacies of the development environment. Given the complexities of managing large code bases, the implementation approach may vary depending on specific considerations within a particular environment. In certain scenarios, it may be desirable to have insights that are continuously updated and integrated into the IDE as soon as relevant changes or insights become available. Real-time updates ensure that the displayed insights are always synchronized with the latest contextual information, such as changes in production-related factors (invocations, duration, cost) or the emergence of new errors.

Without loss of generality, below are provided a list of potential insights and method of presentation thereof. Each insight may be presented in the IDE above the relevant function, each updating in real-time based on updates in the insights dataset.

Production-Related Markers:

A marker that lights up when the function runs in production and gradually fades away. In a function that runs often (e.g. more than a predetermined minimal frequency (e.g., at least once every 5 minutes)) it will remain visible and bright.

A marker showing the CPU load of the function. The marker may change its appearance when the CPU load goes up or down (based on the production behavioural signature).

A marker showing that a function runs in multiple different kinds of servers (e.g., both EC2™ and Lambdas™).

A marker showing the duration of the function. The marker may change its appearance when the duration increases or decreases.

A marker showing the network load of the function. The marker may change its appearance when the network load increases or decreases.

A marker showing the storage load of the function. The marker may chance its appearance when the storage load increases or decreases A marker indicating that CPU load/duration/network load/storage load has worsened or improved in production within a sliding window of a predetermined duration (e.g., in the past 10 days).

A marker indicating that the duration of the function is significantly impacted by synchronous calls, e.g., the ratio between total duration time and idle time waiting for synchronous calls to be completed is above a threshold (e.g., above 20%, 30%, 50%, or the like).

A marker indicating that the function's reliance on synchronous calls has changed within a sliding window of a predetermined duration (e.g. in the past 2 weeks).

A marker showing that the function has started throwing errors in production within a sliding window of a predetermined duration (e.g., in the last month)

Source Code Repository-Related Markers:

A marker that shows that the function has been changed in the main version within a sliding window of a predetermined duration (e.g., in the past 10 days)

A marker that shows that the function has had many contributions by many developers. The value of the insight may be a number of developers that have more than a predetermined number of contributions to the function (e.g., more than 50 contributions). If the number of such developers exceeds a predetermined threshold (e.g., 5 developers), the insight may be relevant and may be displayed.

A marker that shows the function has been reverted many times (e.g. more than a predetermined number of times (e.g., 5, 10, 10% of the number of times it was committed, or the like).

A marker that shows that a ratio of changes made by senior developer with respect to all changes is above a predetermined threshold (e.g., over 50%). In some cases, the list of senior developers can be manually provided. Additionally, or alternatively, the list may be automatically deduced. For example, an employee directory may be investigated to retrieve each developers' title, from which seniority status may be determined.

Workstation and IDE-Related Markers:

A marker showing how many people (e.g. more than 5) are heavily viewing (e.g. have spent more than 20 seconds viewing) the function.

A marker triggering that the function is currently either saved but not committed yet by another user, or is currently edited by another developer. The marker may identify the other developer.

A marker showing the function has been debugged within a sliding window of a predetermined duration (e.g., in the last week), and by which developer.

High-Impact Integrated Markers:

Some markers may stem from integrating multiple insights from different sources. Below are a few, non-limiting examples.

A marker that signals that there was a recent (e.g. in past 30 days) change to the function and that new errors have started appearing in production after the change was made.

A marker that shows that a function that hasn't had its code change for a while (e.g., in the last 10 weeks), but its production behaviour signature recently (e.g. in past 30 days) changed.

A marker that shows that the function that runs frequently (e.g. >30 times/day) in production but is also edited or committed-but-not-saved by more than 1 other developer.

On Step 160, the developer may want to view additional details about a specific insight. A displayed marker may be clickable in the IDE, leading to a web portal showing an expanded view of all the data points contributing to the selected marker. Additionally, or alternatively, additional data points and insights related to the same code element may also be shown in the web portal. In some cases, the web portal may display all insights about the code element, including insights excluded on Step 156. Additionally, or alternatively, the web portal may display insights with indicators (e.g., 232*i*, 234*i*, 2361, 244*i* of FIG. 2B), graphical icons (234*g*, 242*g*, 244*g*), or the like. In some cases, significance value of an insight may be displayed, relevant thresholds (e.g., significance thresholds, critical thresholds, recency irrelevance threshold, or the like), computed score, or the like.

Figure 2A:
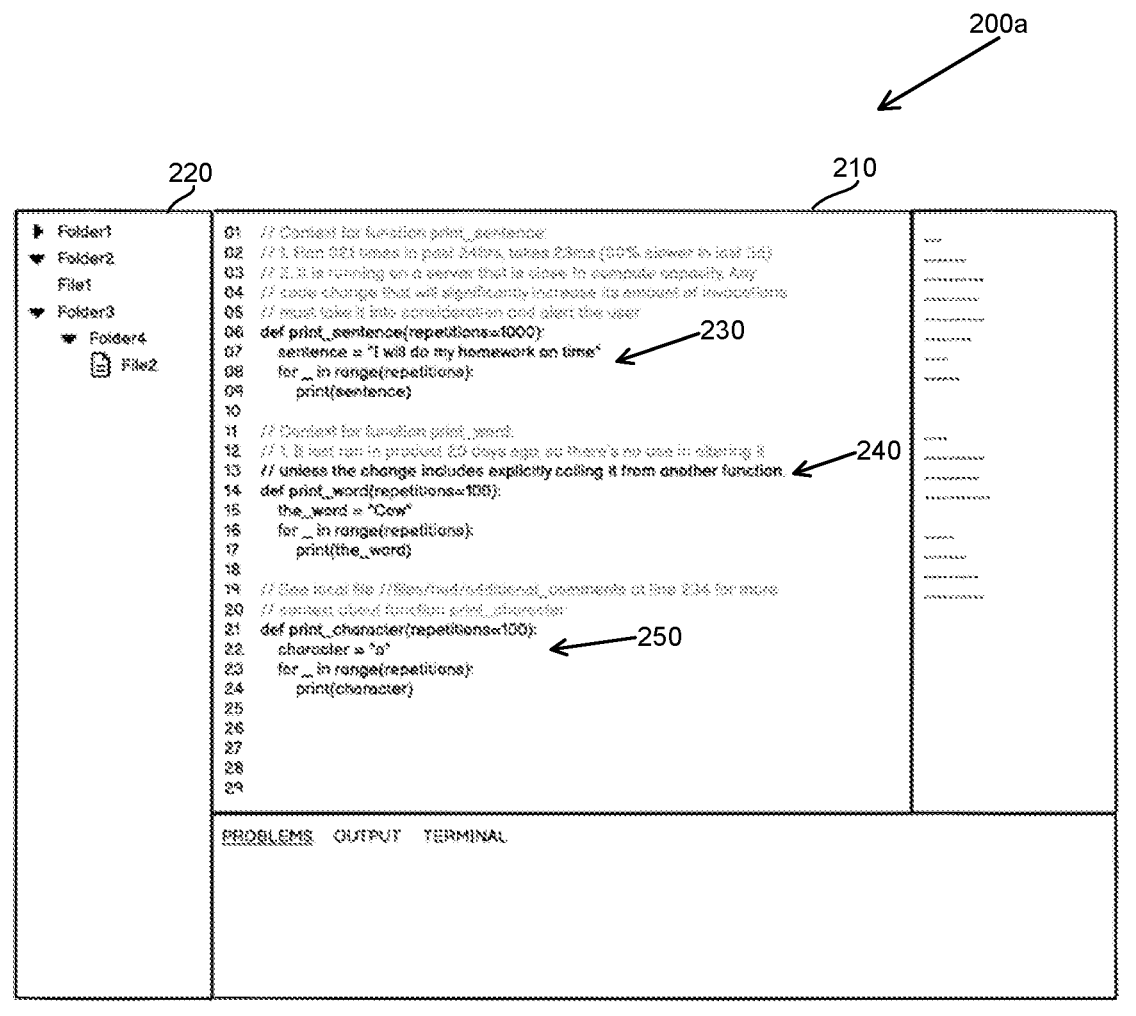

Referring now to FIG. 2A showing a schematic illustration of an IDE, in accordance with some exemplary embodiments of the disclosed subject matter.

IDE 200*a* may be a GUI utilized by a developer to develop code. IDE 200*a* may be utilized to show code to the developer, allow the developer to update the code, or the like. IDE 200*a* exemplifies different embodiments of presenting the insights by introducing insights into the code base.

Code Pane 210 shows content of a file from the code base, as selected in the File Pane 220. Code Pane 210 shows a file with three functions, Functions 230, 240, 250.

Function 230 appearing in lines 06-09 may comprise a code of a function "print_sentence". Above the function definition, at lines 01-05, a comment is shown. The comment provides: "Context for function print_sentence" in line 01. Line 02 provides a first insight ("Ran 321 times in past 24 h[ou]rs, takes 23 ms (30% slower in last 3d[ays])"). Lines 03-05 provide a second insight, explaining that the function is running on a server that is close to compute capacity and the implication of such insight-any code change that will significantly increase its number of invocations must take this fact into consideration. The comment may be planted in the code by a software agent (e.g., either at a server side or at the client device).

Similarly, Function 240, appearing in lines 14-17, has a comment in lines 11-13 that is generated and introduced by a software agent, in accordance with the disclosed subject matter. The comment explains that the function print_word was last invoked in the production environment 20 days ago. Hence, there is no use in altering it unless the developer also adds a new invocation of the function.

Function 250 is shown on lines 21-24. A comment appearing in lines 19-20 simply points to a file in which the information is placed. Specifically, the comment points to a specific textual file (//files/hud/additional_comments) at a specific line (234). It is noted that such a referral is also provided in a comment so it does not affect compilation. On the other hand, whenever the information and insight are updated, there is no need to change the code itself, and instead the non-code textual file is updated. The code is updated only to point to the non-code file, e.g., at the first time insights about the function are introduced, or if the location of the insights has changed.

It is noted that in some cases, a client-based software agent may be integrated into the IDE and may display to the user the insights instead of, or in addition to the comments shown at the code base. For example, lines 19-20 may be dynamically replaced for presentation purposes only, to include the insights (e.g., in a similar manner to lines 1-5). So, the software agent that is integrated into IDE 200*a* may replace the text for presentation purposes only, without changing the code itself, to show the actual insights instead of a referring statement.

Figure 2B:
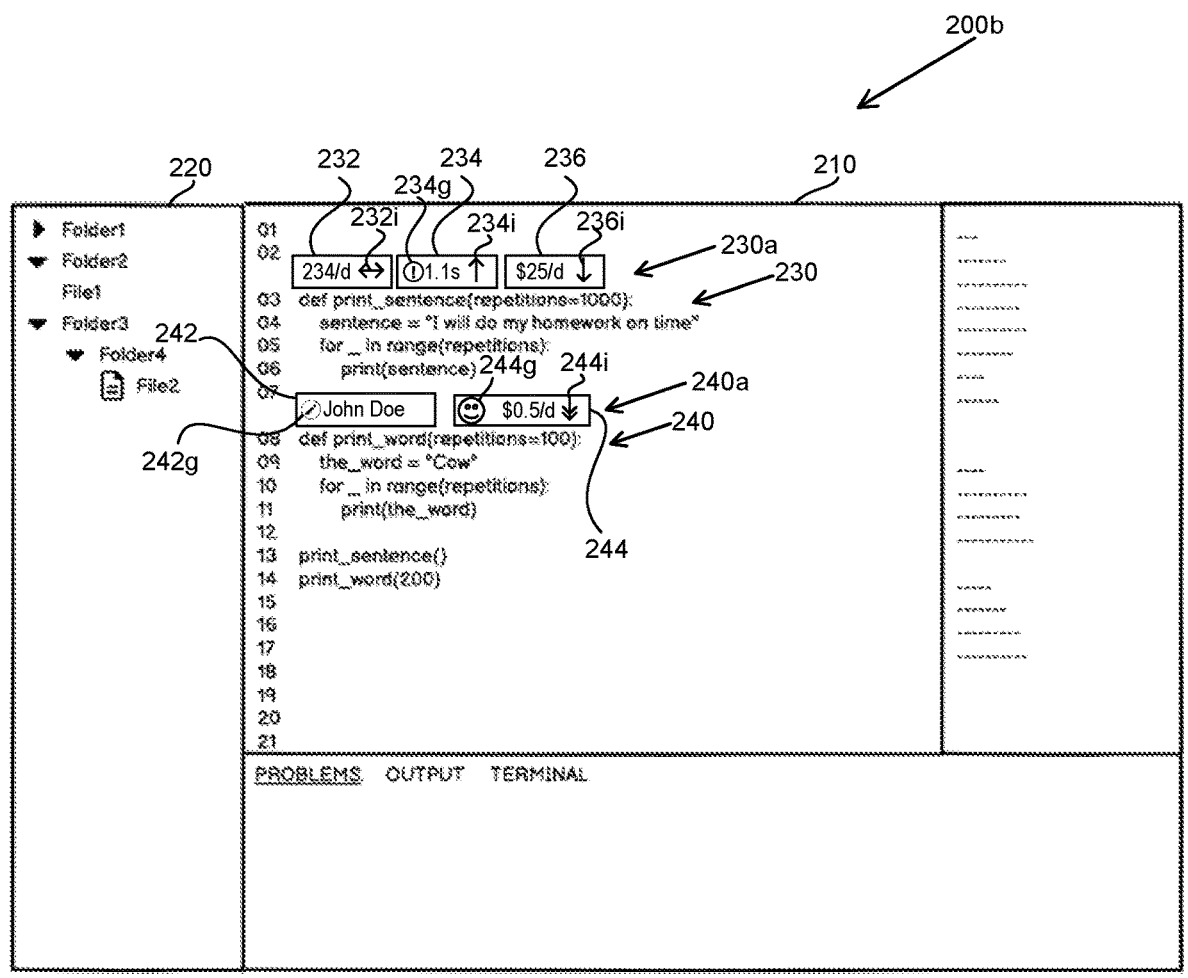

Referring now to FIG. 2B showing a schematic illustration of an IDE, in accordance with some exemplary embodiments of the disclosed subject matter.

IDE 200*b* shows an alternative implementation in which visual markers are shown within Code Pane 210. The visual markers may be shown in an integrated manner, next to the header of the relevant function. However, as can be seen in Code Pane 210, they may not be associated with any specific code line, as they are not part of the code base itself and are merely a presentation layer over the displayed code.

With respect to Function 230, insights are presented in area 230*a*. Similarly, area 240*a* is used to present insight related to Function 240. As can be seen, there are a different number of insights with respect to the different functions. It is noted that in some cases, no insights may be presented with respect to some functions.

As can be appreciated, different insights are shown with respect to the different functions. Also, some insights may be available but not be displayed due to different reasons such as being insignificant, being old and non-recent, or due to being prioritized below other insights that are being displayed.

Referring to Function 230, Insight 232 indicates that Function 230 is invoked in production 234 time per day. Indicator 232*i* shows that the value of the insight remains stable. Stability may be determined based on whether there is a change above a predetermined threshold. So, there may be a potential change in the value, but only if such change is considered significant, a non-stable indicator may be shown. The threshold may be different to different insight types. In some cases, the threshold may attempt to differentiate between statistically significant changes and statistically non-significant changes.

Insight 234 indicates that duration time of Function 230 is, on average, 1.1 seconds. Indicator 234*i* indicates there's an increase in the value that is above the relevant threshold. As this insight may be considered as important, a Graphical Icon 234*g* indicating "danger" may be displayed (234*g*). In some cases, Graphical Icon 234*g* may be displayed when the insight is considered "critical". Additionally, or alternatively, Graphical Icon 234*g* may be displayed when the insight's impact is above a threshold. Additionally, or alternatively, Graphical Icon 234*g* may be displayed when the priority score is above a threshold.

Insight 236 indicates that the average daily cost of executing Function 230 in production is 25 USD per day. The cost may be determined based on resource costs (e.g., cloud computing costs) and based on costs of third-party SaaS services invoked by Function 230. Indicator 236*i* indicates the cost has recently (e.g., in a sliding window of a predetermined time duration) reduced.

Insight 242 indicates that another developer is currently editing (Graphical Icon 242*g*) Function 240. Insight 242 names the other developer-John Doe, enabling the developer to contact the other developer to avoid potential conflicts.

Insight 244, similar to Insight 236, relates to the average daily cost of executing Function 240. However, Insight 244 indicates a significant reduction in costs (Indicator 244*i*). Furthermore, a Graphical Icon 244*g* is displayed to rely the positive meaning of the reduced cost.

Figure 3A:
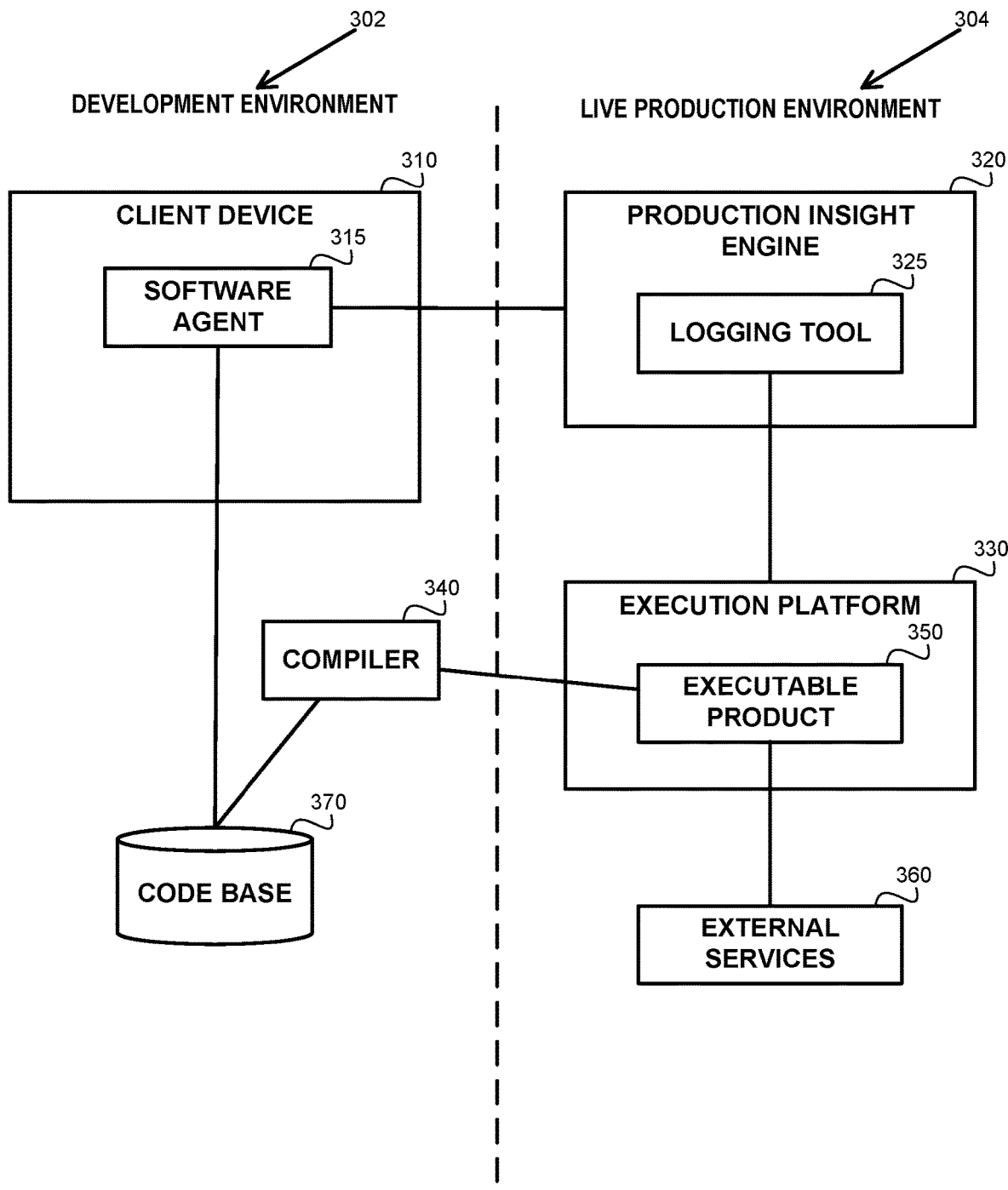
FIGS. 3A-3E show block diagrams of systems, in accordance with some exemplary embodiments of the disclosed subject matter.

Referring now to FIG. 3A showing a block diagram of a system, in accordance with some exemplary embodiments of the disclosed subject matter.

The system encompasses two environments: a Development Environment 302 and a Live Production Environment 304. Development Environment 302 may be a controlled and isolated computing environment dedicated for software development, testing, and debugging purposes. Development Environment 302 may provide a space where software developers and engineers can create, modify, and optimize code, applications, or software solutions. Live Production Environment 304 may be an actual operational environment where the finalized and tested software, applications, or systems are deployed and made available to end-users.

Live Production Environment 304 may include Execution Platform 330 for executing Executable Product 350. Execution Platform 330 may be one or more server, computer nodes, processors, or the like, that are used for executing Executable Product 350. Executable Product 350 may be an outcome of a compilation of Code Base 370 or portion thereof, as compiled by Compiler 340. It is noted that as explained above, the disclosed subject matter is not limited to a compiler-based development language, and Executable Product 350 may be executable by other means, such as using an interpreter.

In some exemplary embodiments, a Production Insight Engine 320 may be deployed within Live Production Environment 304. Production Insight Engine 320 may be configured to derive production insights pertaining to code elements within a Code Base 370. Each production insight may be determined based on data derived from Live Production Environment 304, when executing Executable Product 350. The insights may comprise production information regarding various aspects of the code elements in the Code Base 370. The insights encompass a wide range of parameters, including but not limited to performance, invocation rate, costs, and cross-service interactions.

Additionally, or alternatively, Production Insight Engine 320 may be configured to derive the production insights based on a log recorded by a Logging Tool 325 configured to monitor execution of Executable Product 350 in Live Production Environment 304.

It is noted that Production Insight Engine 320 may or may not be executed by Execution Platform 330. In some cases, Logging Tool 325 may be executed by Execution Platform 330 for monitoring execution of Executable Product 350, while the modules of Production Insight Engine 320 that generate a derived insight from the monitored data may be executed on other computers.

Additionally, or alternatively, Executable Product 350 may utilize External Services 360. External Services 360 may be separate from Code Base 370, but may be called upon or used by Executable Product 350. External Services 360 may be a third-party service, platform, or software component that is accessed via APIs or other means to perform specific tasks or functionalities required by the Executable Product 350. External Services 360 may be a third-party SaaS service being called by Executable Product 350. Production Insight Engine 320 may be configured to derive insights based on data related to the interactions with these external services, such as the frequency of these calls, potential associated costs, time awaiting synchronous calls to be completed, or the like.

In some exemplary embodiments, a Software Agent 315 deployed on a Device 310, may bridge the gap between the production insights and the code development process. Software Agent 315 may be configured to automatically integrate the production insights derived by Production Insight Engine 320 into the Code Base 370 that is displayed to the developer. It is noted that Device 310 may be a client device utilized by a developer. Additionally, or alternatively, Device 310 may be a non-user device, such as a server.

Figure 3B:
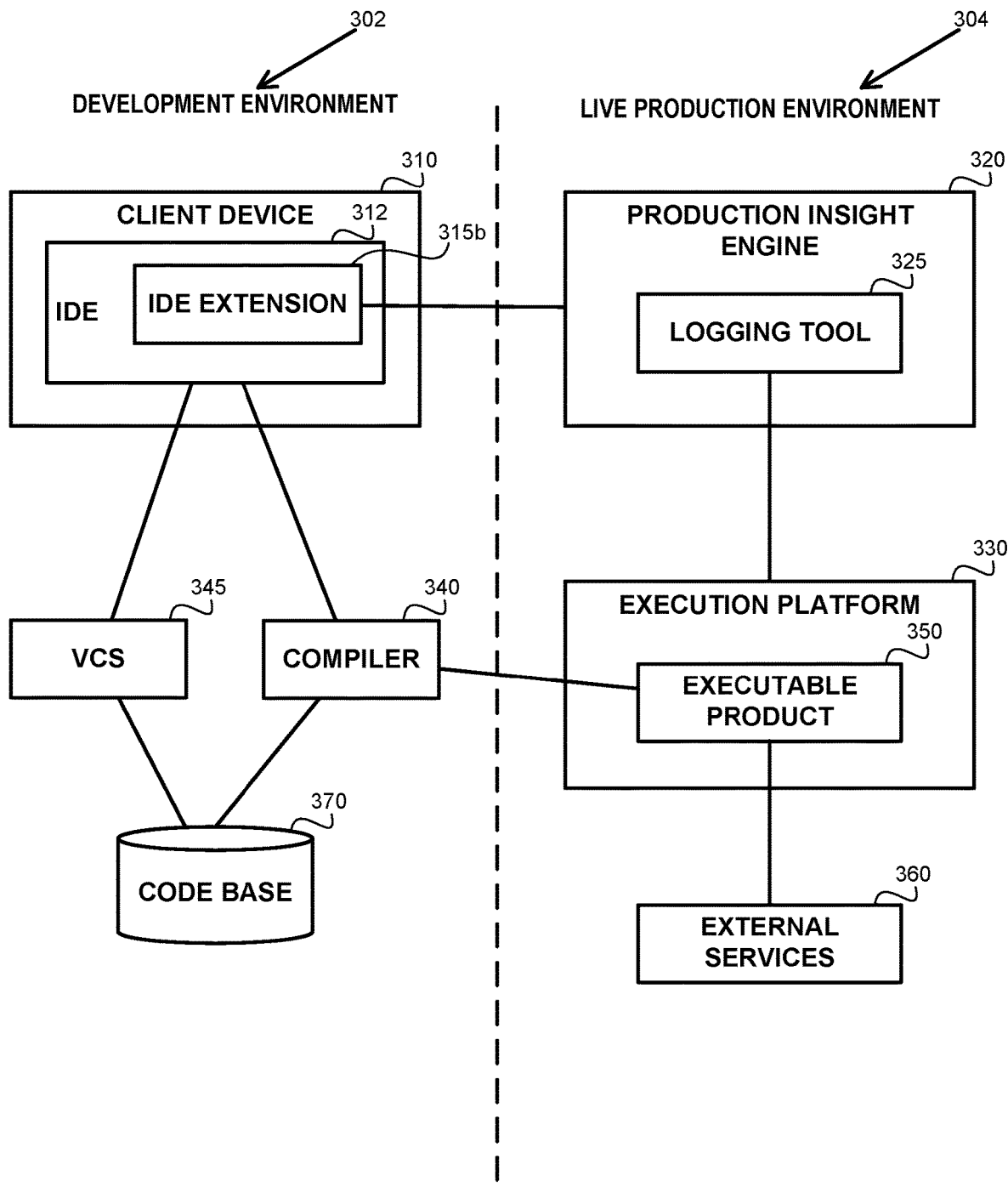

Referring now to FIG. 3B showing a block diagram of a system, in accordance with some exemplary embodiments of the disclosed subject matter.

In some exemplary embodiments, IDE Extension 315b may act as the Software Agent 315 within IDE 312, automatically displaying insights to the developer. IDE Extension 315b may be configured to automatically add a display layer conveying the insights derived by Production Insight Engine 320 with respect to code elements in Code Base 370, so that they are available to the developer while using IDE 312.

Additionally, or alternatively, IDE Extension 315b (or generally Software Agent 315) may be configured to derive non-production insights, such as insights derived from VCS 345. In some exemplary embodiments, VCS 345 may be utilized by developers to update Code Base 370. In some exemplary embodiments, updates to Code Base 370 may be performed through VCS 345. VCS 345 may retain information relating to which developer committed which code change and when. VCS 345 may retain branch and merge information. In some cases, VCS 345 may retain information about the content of each code change. In some exemplary embodiments, based on the information retained in VCS 345, insights may be derived, such as insights relating to which developer is in the original author of a code element, which developer contributed to the code element, which developer contributed the recent changes to the code element, which developer contributed to the code element code lines that relate to a specific programming aspect, which developer is currently editing or working on the code element (e.g., a developer that checked-out the file containing the code element and did not check it back in. In some cases, it may be checked whether the un-checked version has a change in the code element itself), or the like. In some exemplary embodiments, insights derived from the VCS 345 may be created and introduced into an insights dataset (not shown) and presented in IDE 312, when applicable.

Figure 3C:
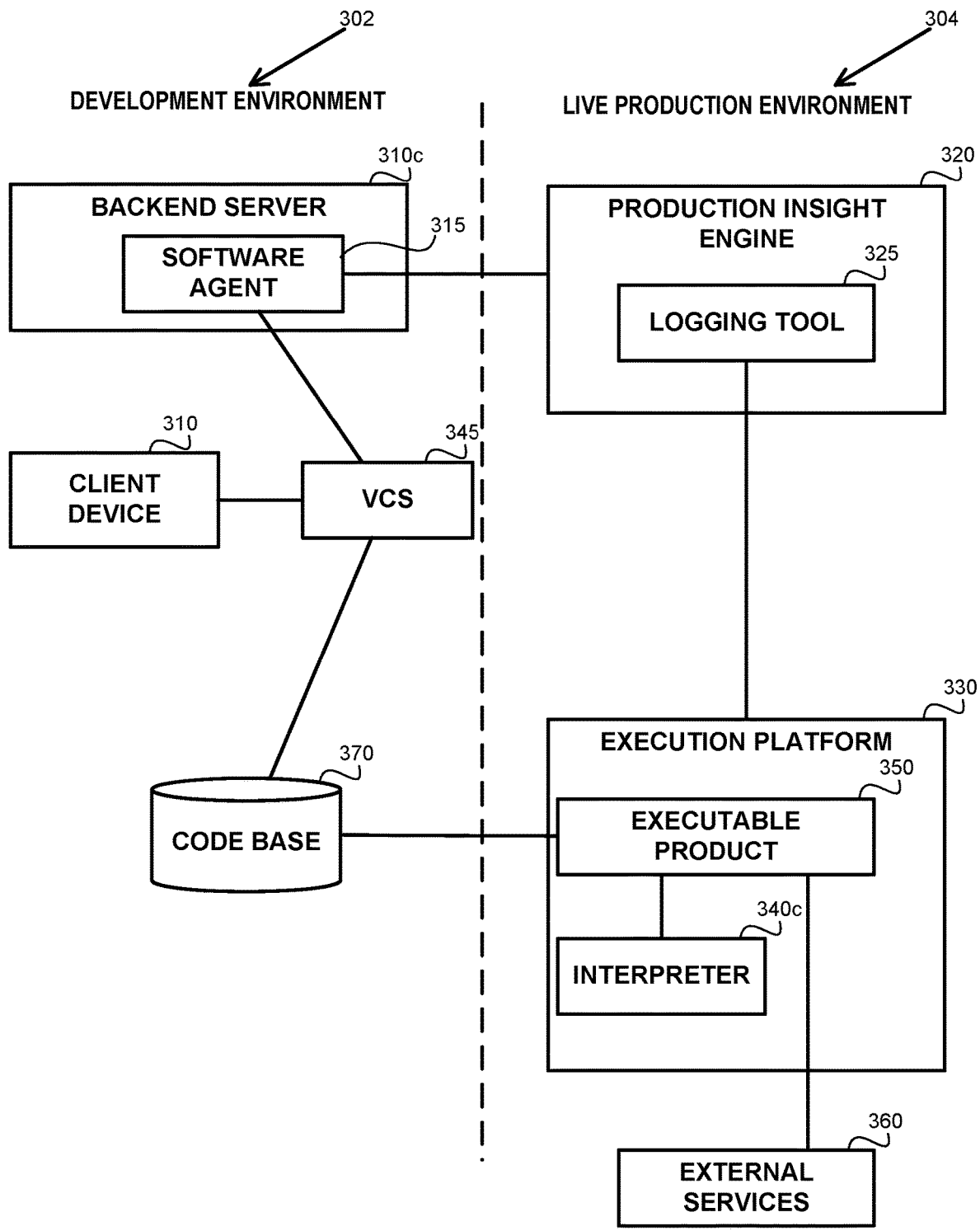

Referring now to FIG. 3C showing a block diagram of a system, in accordance with some exemplary embodiments of the disclosed subject matter.

In FIG. 3C, Software Agent 315 is shown to be executed and deployed on a Backend Server 310c. In such an embodiment, Software Agent 315 that updates the insights dataset with insight information need not be executed by a client device (e.g., 310). Instead, Software Agent 315 is executed by Backend Server 310c, which may be, for example, a local server, a virtual server, a physical server, a cloud server, or the like. In some exemplary embodiments, Software Agent 315 may update the insights dataset directly.

The insights may be presented to the developer using an IDE (not shown). In some cases, the IDE may be web-based IDE that is accessible via Backend Server 310c (or another web-server, serving web-application). Software Agent 315 may be configured to augment the IDE using the added layer of insights in accordance with the disclosed subject matter.

FIG. 3C also exemplifies that Executable Product 350 can be a non-compiled computer program product, such as in case of an interpreter-based language such as JavaScript™ and Phyton™. In such a case, Executable Product 350 may be deployed by copying it from Code Base 370 to Execution Platform 330. Execution Platform 330 has retained therein an Interpreter 340c that is configured to interpret and execute Executable Product 350.

Figure 3D:
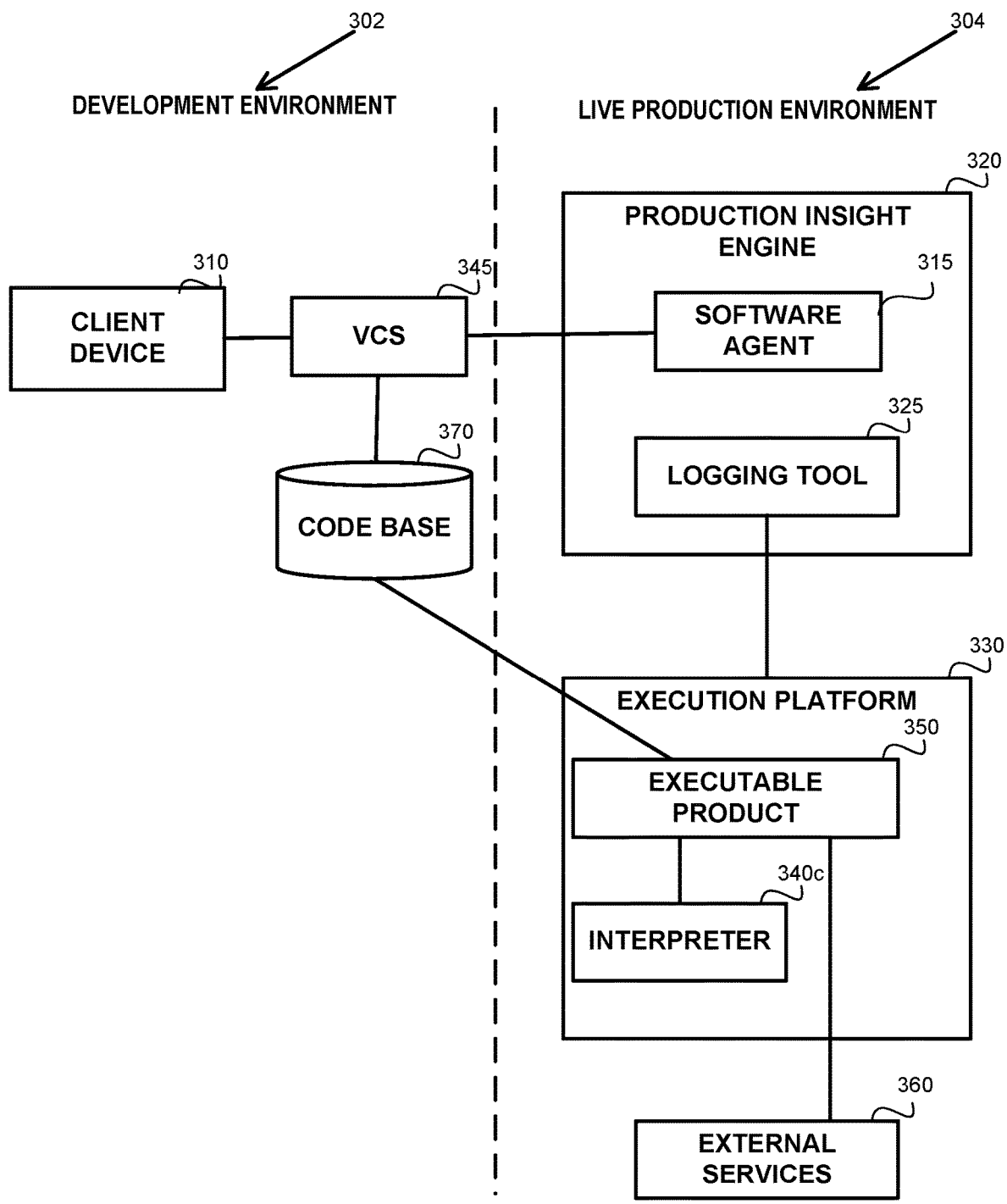

FIG. 3D shows another block diagram of a system, in accordance with some exemplary embodiments of the disclosed subject matter. In FIG. 3D, Software Agent 315 is deployed directly as part of Production Insight Engine 320.

Figure 3E:
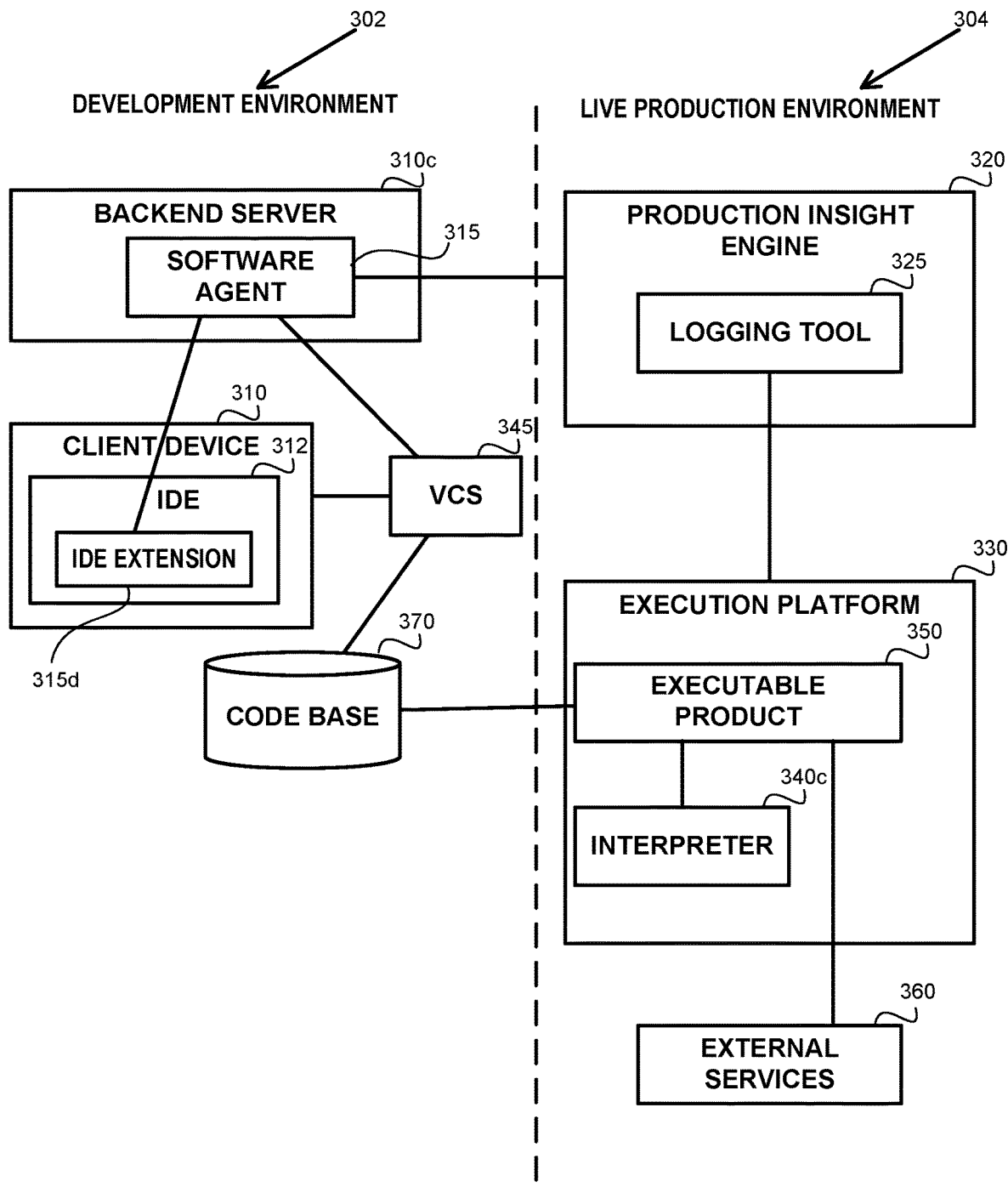

Referring now to FIG. 3E showing a block diagram of a system, in accordance with some exemplary embodiments of the disclosed subject matter. FIG. 3E shows software Agent 315 that is executed by Backend Server 310c, remotely from Client Device 310. Client Device 310 executes IDE 312 whose functionality is augmented by IDE Extension 315d to present the added presentation layer showing the insights derived from Live Production Environment 304 and from Development Environment 302.

Figure 4:
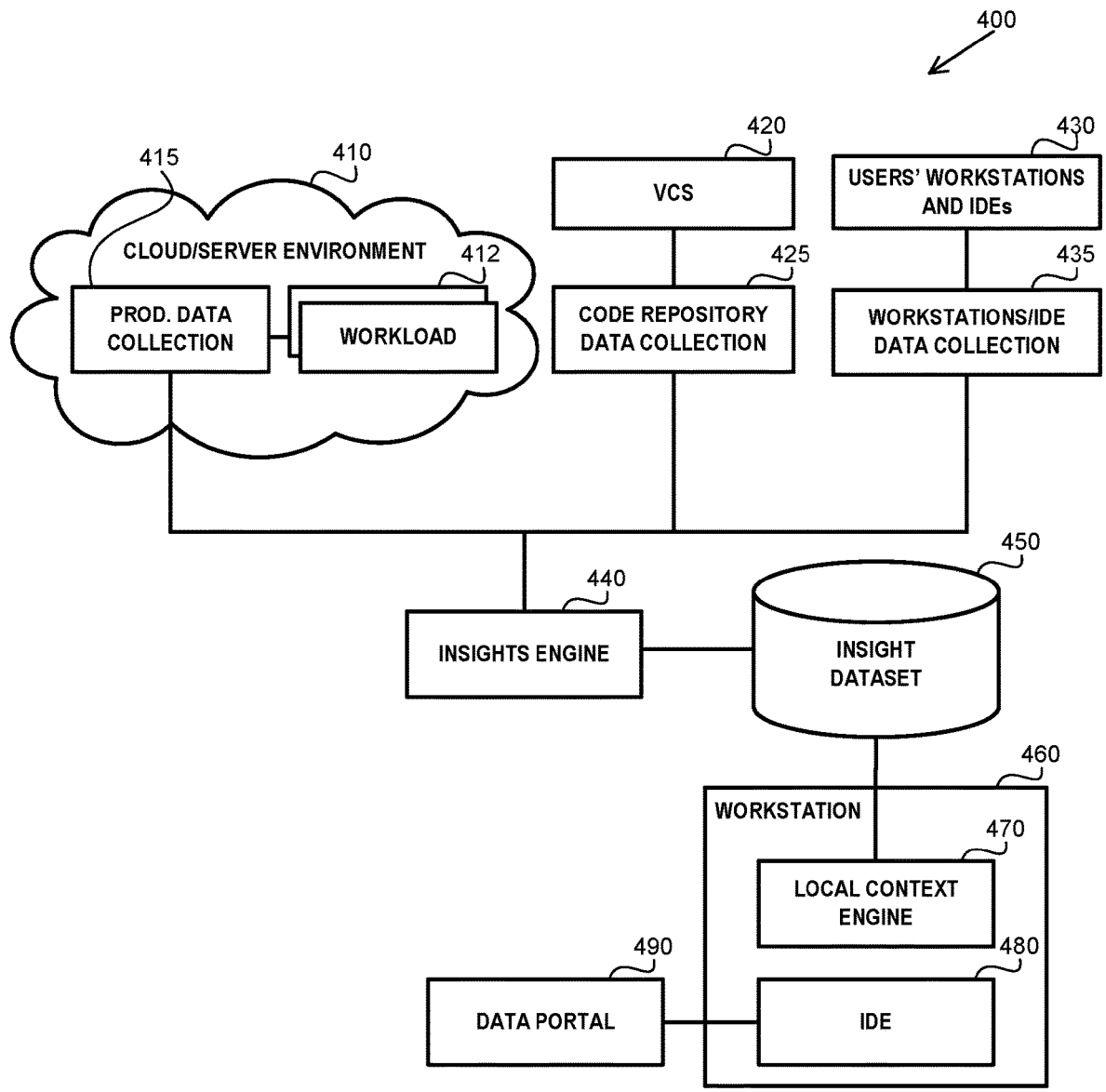
FIG. 4 shows a computerized environment, in accordance with some exemplary embodiments of the disclosed subject matter.

FIG. 4 shows a computerized environment, in accordance with some exemplary embodiments of the disclosed subject matter.

Environment 400 comprises Cloud/Server Environment 410 in which Servers 412 are being executed. Servers 412 are based on code developed by developers. Production Data Collection 415 collects production data relating to Servers 412, such as resource utilization, execution duration, thrown errors, or the like. Production Data Collection 415 works at a defined granular level, such as function-level granularity. It is noted Cloud/Server Environment 410 may be implemented using cloud server, using on prem-server, using a serverless environment, or the like.

Environment 400 comprises VCS 420 that is utilized to develop the code. Code Repository Data Collection 425 is configured to collect data from VCS 420, such as identify contributors of code with respect to code elements, identify reverted updates with respect to code elements, identify checked out files and code elements included therein, or the like.

Environment 400 comprises Users' Workstations and IDEs 430. Developers may utilize workstations and/or IDEs to develop the code. It is noted that Users' Workstations and IDEs 430 may be functionally coupled to VCS 420. Additionally, or alternatively, Users' Workstations and IDEs 430 may be utilized to deploy Servers 412 to Cloud/Server Environment 410 once code is deemed ready-to-be-deployed. Workstations/IDE Data Collection 435 may be configured to collect data from Users' Workstations and IDEs 430, such as information regarding code elements being viewed or edited by the developer, code sections that are visible to the developer, files and code elements contained therein that are loaded and displayed to the developer, or the like.

Insight Engine 440 may retrieve the information collected by any one or combination of Production Data Collection 415, Code Repository Data Collection 425, Workstation/IDE Data Collection 435. Based on the collected data, Insight Engine 440 may derive insights that are stored in Insights Dataset 450.

In some exemplary embodiments, Insight Engine 440 may work periodically, such as retrieve on an hourly basis collected data and ingest such data. Additionally, or alternatively, Insight Engine 440 may be triggered by a data collection module (e.g., 415, 425, 435) in response to collection specific data, so that Insight Engine 440 may ingest the data. In some cases. Insight Engine 440 may ingest data in a hybrid method-ingest collected data periodically and be triggered when specific information that needs to be made available quickly is collected. For example, performance measurement (collected by Production Data Collection 415) may be ingested periodically, while information about other developers' activities (collected by Workstation/IDE Data Collection 435) may be ingested immediately once they are obtained.

Workstation 460 may be a workstation utilized by the developer/user for developing the code. In some cases, Workstation 460 is also part of Users' Workstations and IDEs 430. Workstation 460 includes IDE 480 utilized by the developer for developing the code. IDE 480 may be configured to present insights such as using markers or other visual representation. In some cases, IDE 480 may be a dedicated IDE that is pre-configured to perform functionality in accordance with the disclosed subject matter. In other cases, IDE 480 may be augmented to perform such functionality, e.g., using an IDE plugin, IDE extension, client-side code in web-based IDE, or the like.

Local Context Engine 470 may be configured to determine the context of the developer. Local Context Engine 470 may monitor usage of IDE 480, such as opened documents, displayed portion of the opened document, cursor(s) location(s), or the like. In some exemplary embodiments, Local Context Engine 470 may determine the identity of the developer (e.g., developer ID). Additionally, or alternatively, Local Context Engine 470 may determine seniority status of developer. Additionally, or alternatively, Local Context Engine 470 may determine list of expertise of the developer, such as based on past activity, based on manual input, based on LinkedIn™ profile or other publicly available profile, or the like.

Based on the local context determined by Local Context Engine 470, the insights that are relevant to the current context of the developer may be retrieved. The insights may be retrieved from Insights Dataset 450. In some exemplary embodiments, a subset of the relevant insights may be selected based on a prioritization criterion, such as by including all critical insights and selecting top N insights between other insights, that are not critical, but also deemed significant and within recency threshold. IDE 480 may be utilized to present the selected insights to the developer.

In case the developer wants to receive additional information about an insight or code element, the developer may interact with IDE 480 and be referred to Data Portal 490. In case the developer selected a code element, Data Portal 490 may display all insights about the selected code element. In case the developer selected an insight, all information about the insight may be presented, such as all data points that were collected and utilized to conclude the insight by Insight Engine 440. Additionally, or alternatively, other insights relating to the same code element to which the selected insight relates may be displayed as well.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random-access memory (RAM), a read-only memory (ROM), an erasable programmable read-only memory (EPROM or Flash memory), a static random access memory (SRAM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Local Area Network (LAN), and a Wide Area Network (WAN). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, aspect oriented programming language, procedural programming language, or the like. The computer readable program instructions may execute entirely on the user's computer, partly on the user's computer, as a stand-alone software package, partly on the user's computer and partly on a remote computer or entirely on the remote computer or server. The remote computer may be connected to the user's computer through any type of network, including a LAN, a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments

What is claimed is:

1. A method comprising:
   tracking real time coding activity of a developer, wherein the developer utilizes an Integrated Development Environment (IDE) to develop a code base;
   determining, based on the real time coding activity, a code element with which the developer engages in real time, wherein the code element is viewable in the IDE, wherein the code element comprises a single function of the code base;
   determining, based on said determining the code element, a set of insights pertaining to the code element, the set of insights comprise at least a real-time production insight and a version control insight, wherein:
      the real-time production insight is determined based on first data gathered in real time by a logging tool in a five production environment, the first data corresponding to performance metrics of an execution of a computer program product that is deployed in the live production environment, the computer program product is an executable program that is generated based on the code base or portion thereof, wherein the logging tool is executed in the live production environment and is configured to automatically monitor the execution of the computer program product in real time; and
      the version control insight is determined based on second data collected from a Version Control System (VCS), the second data regarding historic changes made by developers to the code base, the second data indicating identities of the developers that contributed code to the code element;
   selecting a subset of insights from the set of insights, wherein the subset of insights excludes at least one insight that is included in the set of insights;
   displaying, in real time, the subset of insights to the developer within the IDE in a location adjacent the code element with which the developer engages in real time, thereby automatically integrating the real-time production insight into a development environment of the developer without the developer having to switch between the live production environment and the development environment, wherein the development environment comprises the IDE, wherein said displaying comprises embedding a visual presentation of the subset of insights between first and second code lines of the code base, wherein the code element includes the second code line below the visual presentation and excludes the first code line above the visual presentation, wherein said displaying comprises embedding the visual presentation directly inline with the first and second code lines of the code base, wherein the visual presentation does not affect a compilation of the code base; and in response to the developer interacting with a visual indicator of the visual presentation that represents a target insight, opening a portal with added information about collected data that relates to the target insight and about all insights related to the code element, whereby the portal provides information about the at least one insight that is included in the set of insights and excluded from the subset of insights.

2. The method of claim 1, further comprises:
obtaining a third insight pertaining to the code element, the third insight is determined based on third data that is derived from the live production environment at a later time than a time at which the first data is derived, the third insight contradicts the real-time production insight; and
in response to said obtaining the third insight, automatically updating the visual presentation to include the third insight and to exclude the real-time production insight.

3. The method of claim 1, wherein the coding activity comprising an activity of the developer that is not saved by the IDE.

4. The method of claim 1, wherein the IDE is configured to present the visual presentation over a displayed code, wherein the visual presentation comprises comments inserted into the displayed code between the first and second code lines or visual markers that are integrated next to a header of the single function, wherein the visual markers are inserted into the displayed code between the first and second code lines.

5. The method of claim 1, wherein the subset of insights comprises a third insight, wherein the third insight is determined based on third data, the third data comprising collected monitored activity of the developers in the development environment that is used to develop the code base, wherein the third insight relates to another developer viewing the code element, the another developer different from the developer.

6. The method of claim 1, wherein the version control insight is determined based on at least one of:
a frequency of commit operations;
an intensity of development activity at one or more time periods;
branching patterns, the branching patterns comprising at least one of patterns of branch creations, patterns of branch merges, or patterns of branch abandonments;
code review metrics;
conflict resolutions;
an identity of an original developer that originally developed the code element;
identities of certain developers that contributed to writing the code element more than other developers;
whether a number of contributions to the code element exceeds a predetermined threshold; or
associations of developer identities with error types.

7. The method of claim 1, wherein the subset of insights is selected from the set of insights based on expertise areas of the developer, wherein the expertise areas are inferred from a history of code contributions of the developer.

8. The method of claim 1, wherein the coding activity is determined based on at least one of:
a location of a keyboard cursor in the IDE;
a location of a mouse cursor in the IDE;
a code file that is opened in the IDE; or
a visible portion of the code that is displayed to the developer in the IDE.

9. The method of claim 1 further comprising generating an alert to the developer, the alert configured to inform the developer of potential impacts of code modifications to the code element, wherein the alert is determined based on the set of insights, whereby assisting the developer with making informed decisions regarding the code modifications to the code element.

10. The method of claim 1, wherein the performance metrics comprise at least one of:
an error rate metric indicating an error rate of the code element when executed in the live production environment;
an execution duration metric indicating an execution duration of the code element when executed in the live production environment;
an invocation frequency metric indicating an invocation frequency of the code element in the live production environment; or
a resource utilization metric indicating utilization of third-party resources by the code element when executed in the live production environment.

11. The method of claim 1, wherein the live production environment is an execution environment in which user-ready software is deployed and executed and utilized by users, the live production environment is distinguished from the development environment utilized by the developer in developing the code base, the live production environment is distinguished from the IDE.

12. A computer program product comprising a non-transitory computer readable medium retaining program instruction, which program instructions when read by a processor, cause the processor to perform:
tracking real time coding activity of a developer, wherein the developer utilizes an Integrated Development Environment (IDE) to develop a code base;
determining, based on the real time coding activity, a code element with which the developer engages in real time, wherein the code element is viewable in the IDE, wherein the code element comprises a single function of the code base;
determining, based on said determining the code element, a set of insights pertaining to the code element, the set of insights comprise at least a real-time production insight and a version control insight, wherein:
the real-time production insight is determined based on first data gathered in real time by a logging tool in a live production environment, the first data corresponding to performance metrics of an execution of a computer program product that is deployed in the live production environment, the computer program product is an executable program that is generated based on the code base or portion thereof, wherein the logging tool is executed in the live production environment and is configured to automatically monitor the execution of the computer program product in real time; and the version control insight is determined based on second data collected from a Version Control System (VCS), the second data regarding historic changes made by developers to the code base, the second data indicating identities of the developers that contributed code to the code element;

selecting a subset of insights from the set of insights, wherein the subset of insights excludes at least one insight that is included in the set of insights;

displaying, in real time, the subset of insights to the developer within the IDE in a location adjacent the code element with which the developer engages in real time, thereby automatically integrating the real-time production insight into a development environment of the developer without the developer having to switch between the live production environment and the development environment, wherein the development environment comprises the IDE, wherein said displaying comprises embedding a visual presentation of the subset of insights between first and second code lines of the code base, wherein the code element includes the second code line below the visual presentation and excludes the first code line above the visual presentation, wherein said displaying comprises embedding the visual presentation directly inline with the first and second code lines of the code base, wherein the visual presentation does not affect a compilation of the code base; and in response to the developer interacting with a visual indicator of the visual presentation that represents a target insight, opening a portal with added information about collected data that relates to the target insight and about all insights related to the code element, whereby the portal provides information about the at least one insight that is included in the set of insights and excluded from the subset of insights.

13. The computer program product of claim 12, wherein program instructions, when read by the processor, further cause the processor to perform:

obtaining a third insight pertaining to the code element, the third insight is determined based on third data that is derived from the live production environment at a later time than a time at which the first data is derived, the third insight contradicts the real-time production insight; and in response to said obtaining the third insight, automatically updating the visual presentation to include the third insight and to exclude the real-time production insight.

14. The computer program product of claim 12, wherein the subset of insights is selected from the set of insights based on expertise areas of the developer, wherein the expertise areas are inferred from a history of code contributions of the developer.

15. The computer program product of claim 12, wherein the IDE is configured to present the visual presentation over a displayed code, wherein the visual presentation comprises comments inserted into the displayed code between the first and second code lines or visual markers that are integrated next to a header of the single function, wherein the visual markers are inserted into the displayed code between the first and second code lines.

16. The computer program product of claim 12, wherein the subset of insights comprises a third insight, wherein the third insight is determined based on third data, the third data comprising collected monitored activity of the developers in the development environment that is used to develop the code base, wherein the third insight relates to another developer viewing the code element, the another developer different from the developer.

17. The computer program product of claim 12, wherein the coding activity comprising an activity of the developer that is not saved by the IDE.

18. A system comprising:

a client device executing an Integrated Development Environment (IDE), wherein a developer is using the IDE to develop a code base;

a live production environment, wherein a computer program product is deployed in the live production environment, the computer program product is an executable program that is generated based on the code base or portion thereof, the live production environment executes the computer program product;

a logging tool that is executed in the live production environment and is configured to automatically monitor an execution of the computer program product in real time; and a processor configured to:

track real time coding activity of the developer;

determine, based on the real time coding activity, a code element with which the developer engages in real time, wherein the code element is viewable in the IDE, wherein the code element comprises a single function of the code base;

determine, based on said determine the code element, a set of insights pertaining to the code element, the set of insights comprise at least a real-time production insight and a version control insight, wherein:

the real-time production insight is determined based on first data gathered in real time by the logging tool in the live production environment, the first data corresponding to performance metrics of the execution of the computer program product; and the version control insight is determined based on second data collected from a Version Control System (VCS), the second data regarding historic changes made by developers to the code base, the second data indicating identities of the developers that contributed code to the code element; and select a subset of insights from the set of insights, wherein the subset of insights excludes at least one insight that is included in the set of insights;

wherein the IDE is configured to provide the developer with an insight display, the insight display displays, in real time, the subset of insights to the developer within the IDE in a location adjacent the code element with which the developer engages in real time, thereby automatically integrating the real-time production insight into a development environment of the developer without the developer having to switch between the live production environment and the development environment, wherein the development environment comprises the IDE, wherein the IDE is configured to embed in the insight display a visual presentation of the subset of insights between first and second code lines of the code base, wherein the code element includes the second code line below the visual presentation and excludes the first code line above the visual presentation, wherein the IDE is configured to embed the visual presentation directly inline with the first and second code lines within the insight display, wherein the visual presentation does not affect a compilation of the code base; and in response to the developer interacting with a visual indicator of the visual presentation that represents a target insight, opening a portal with added information about collected data that relates to the target insight and about all insights related to the code element, whereby the portal provides information about the at least one insight that is included in the set of insights and excluded from the subset of insights.

19. The system of claim 18 further comprises:

The VCS, wherein the VCS is utilized for managing and tracking code changes in the code base; and an insight engine configured to determine insights pertaining to the code base, wherein the insight engine is configured to determine the insights based on information collected by said logging tool, based on data collected from the VCS regarding changes made to the code base, and based on monitored activity of the developers in IDEs that are used to develop the code base.

20. The system of claim 18, wherein the IDE is configured to present the insight display over a displayed code, wherein the visual presentation comprises comments inserted into the displayed code between the first and second code lines or visual markers that are integrated next to a header of the single function, wherein the visual markers are inserted into the displayed code between the first and second code lines; and wherein the system is responsive to a user interaction with a visual indicator of the visual presentation that represents a target insight, wherein in response to the user interaction, the system is configured to open a portal to display added information about collected data that relates to the target insight and about all insights related to the code element, whereby the portal provides information about the at least one insight that is included in the set of insights and excluded from the subset of insights.

* * * * *